US012761505B2

(12) United States Patent
Porter et al.

(10) Patent No.: US 12,761,505 B2
(45) Date of Patent: Oct. 13, 2026

(54) DISTRIBUTED ELECTRO-ABSORPTION MODULATOR SYSTEMS

(71) Applicant: ElectroPhotonic-IC Inc., Kanata (CA)

(72) Inventors: Steven Greig Porter, Ottawa (CA); Lawrence E. Tarof, Kanata (CA); Francois Tremblay, Gatineau (CA)

(73) Assignee: ElectroPhotonic-IC Inc., Kanata (CA)

( * ) Notice: Subject to any disclaimer, the term of this patent is extended or adjusted under 35 U.S.C. 154(b) by 0 days.

(21) Appl. No.: 19/323,185

(22) Filed: Sep. 9, 2025

(65) Prior Publication Data

US 2026/0299326 A1 Oct. 1, 2026

Related U.S. Application Data

(60) Provisional application No. 63/778,687, filed on Mar. 27, 2025.

(51) Int. Cl.
*G02F 1/015* (2006.01)
*G02F 1/01* (2006.01)
(Continued)

(52) U.S. Cl.
CPC .......... *G02F 1/0157* (2021.01); *G02F 1/0121* (2013.01); *G02F 1/025* (2013.01);
(Continued)

(58) Field of Classification Search
CPC ....... G02F 1/025; G02F 1/0157; G02F 1/2255
See application file for complete search history.

(56) References Cited

U.S. PATENT DOCUMENTS 5,825,047 A * 10/1998 Ajisawa .................. G02F 1/025 372/50.21
6,873,801 B1 3/2005 Yamaki et al.
(Continued)

FOREIGN PATENT DOCUMENTS

GB 460562 1/1937
KR 100584332 B1 5/2006
(Continued)

OTHER PUBLICATIONS

Razavi, Behzad; "The Design of Broadband I/O Circuits"; The Analog Mind; Jun. 24, 2021; IEEE Solid-State Circuits Magazine; pp. 6-11,15.
(Continued)

*Primary Examiner* — Michelle R Connelly
(74) *Attorney, Agent, or Firm* — Miltons IP/p.i.

(57) ABSTRACT

An electro-photonic integrated circuit, an optical system comprising an electro-photonic circuit, and a method of operating each. The electro-photonic integrated circuit comprises a distributed EAM comprising a one or more EAM portions optically coupled to generate a modulated optical output from an optical input; a distributed driver comprising a one or more driver portions for receiving a drive signal input for the EAM from an electrical input; the distributed EAM being electrically coupled to the distributed driver; wherein the modulated optical output is based on the optical input and the electrical input to implement equalization. For example, a propagation delay and a gain of the optical input and/or electrical input are combined to provide desired signal characteristics. The electrical propagation delay and optical propagation delay may be matched, or be adjusted, e.g. to provide a mismatch for optimization of both a characteristic impedance and a bandwidth of the distributed EAM.

30 Claims, 18 Drawing Sheets

(51) Int. Cl.
*G02F 1/025* (2006.01)
*G02F 1/21* (2006.01)
*G02F 1/225* (2006.01)

(52) U.S. Cl.
CPC ............ *G02F 1/212* (2021.01); *G02F 1/2255* (2013.01); *G02F 1/2257* (2013.01); *G02F 2201/127* (2013.01)

(56) References Cited

U.S. PATENT DOCUMENTS

| | | | | |
|---|---|---|---|---|
| 7,039,258 | B2 * | 5/2006 | Gunn, III | H04B 10/5053 385/14 |
| 7,317,846 | B2 * | 1/2008 | Keil | G02F 1/225 385/24 |
| 7,426,321 | B2 * | 9/2008 | Eriksson | G02F 1/035 385/2 |
| 7,899,276 | B2 * | 3/2011 | Kucharski | G02F 1/025 385/32 |
| 9,952,456 | B2 * | 4/2018 | Huang | G02B 6/12002 |
| 10,026,723 | B2 * | 7/2018 | Evans | H01L 25/18 |
| 11,374,382 | B2 | 6/2022 | Lin et al. | |
| 11,567,353 | B2 * | 1/2023 | Kharel | G02F 1/0356 |
| 12,021,529 | B2 | 6/2024 | Porter | |
| 12,126,469 | B2 | 10/2024 | Porter et al. | |
| 2002/0071622 | A1 * | 6/2002 | Betts | G02F 1/2257 385/2 |
| 2004/0052442 | A1 * | 3/2004 | Li | G02F 1/01708 385/40 |
| 2015/0036965 | A1 * | 2/2015 | Prosyk | G02F 1/2255 385/3 |
| 2015/0362764 | A1 | 12/2015 | Cunningham et al. | |
| 2020/0116932 | A1 | 4/2020 | Hjartarson et al. | |

FOREIGN PATENT DOCUMENTS

| | | | | |
|---|---|---|---|---|
| WO | WO-2017122136 | A1 * | 7/2017 | G02F 1/2255 |
| WO | 2019114977 | A1 | 6/2019 | |

OTHER PUBLICATIONS

Ginzton, E.L. et al.; Distributed amplifier employing Tcoils: "Distributed Amplification" Proc. I.R.E. vol. 36, pp. 956-969; Aug. 1948.

Machiels, Brecht; "Distributed Amplification in CMOS" Jul. 2012; Katholieke Universiteit Leuven - Faculteit Ingenieurswetenschappen; ISBN 978-94-6018-529-8; 171 pages.

Shahoei, H et al. "Delay Lines"; University of Ottawa; published by J. Webster (ed.) Wiley Encyclopedia of Electrical and Electronics Engineering. Copyright#2014 John Wiley & Sons, Inc., Dec. 2014, pp. 1-15.

* cited by examiner

DISTRIBUTED ELECTRO-ABSORPTION MODULATOR SYSTEMS

CROSS-REFERENCE TO RELATED APPLICATION(S)

This application claims the benefit of United States provisional patent application no. 63/778,687, filed Mar. 27, 2025, entitled “Distributed Electro-absorption Modulator Systems”, which is incorporated herein by reference in its entirety.

This application is related to U.S. provisional patent application No. 63/754,106, filed Feb. 5, 2025, entitled “Differential Electro-absorption Modulator System”, which is incorporated herein by reference in its entirety.

This application is related to U.S. patent application Ser. No. 19/317,684, filed Sep. 3, 2025, entitled “Electro-Absorption Modulator and Monolithic Electro-Photonic Integrated Circuit Comprising an Electro-Absorption Modulator and Driver Electronics”, which is incorporated herein by reference in its entirety.

FIELD OF THE INVENTION

The present invention relates generally to integrated electro-photonic transmitter and receiver systems, and more particularly to electro-absorption modulator (EAM) modules and the driving thereof.

BACKGROUND

An optical electro-absorption modulator (EAM) is an amplitude modulator that works based on the application of a voltage signal. EAMs have a relatively small footprint, low power consumption and can be used in high-speed applications. These include modulation of optical signals, e.g. for high-speed data interconnects within data centers and between data centers, passive optical networks (PON), 5G network communications (i.e. optical core network connected to 5G wireless access) and the like. The EAM is a design based on the Quantum Confined Stark Effect (QCSE). When an electric field is applied to the absorption modulator, the absorption coefficient in the component is changed which causes the intensity of an optical signal at the operational wavelength of the device to be modulated.

Data may be encoded onto an optical signal by direct modulation of an optical source such as semiconductor laser, referred to as a directly modulated laser (DML), or by external modulation of a continuous wave (CW) optical output of a CW semiconductor laser using an external modulator. Electro-absorption modulators (EAMs) are typically more compact than electro-optic modulators, such as MZM (Mach-Zehnder modulators). For example, an EAM may be integrated with a CW semiconductor laser to form an electro-absorption modulated laser (EML). The EML may comprise an EAM, an external laser, and driver electronics. The laser and EAM of an EML may be monolithically integrated, or hybrid integrated, e.g. as described in U.S. patent application Ser. No. 17/687,803, and optionally the driver electronics may also be monolithically integrated.

As described in the above referenced U.S. provisional patent application No. 63/754,106, filed Feb. 5, 2025, entitled “Differential Electro-absorption Modulator System”, there are a number of known approaches for driver circuits for electro-absorption modulation of optical signals, including the classic single ended approach, a variation thereof, and a differential approach.

In known approaches the EAMs do not have sufficient flexibility for cater for all use case scenarios and variation to certain constraints would be helpful to adapt an integrated electro-absorption modulator (EAM) module to different circuit designs and applications.

This is particularly the case as data communication technology advances, and speed of operation continues to be pushed beyond the current norms, there is a need for EAM and EML which provide improved performance for high-speed modulation, e.g. next generation high-speed modulation schemes 112 GB, 224 Gb/s PAM4 modulation, 224 GB, 448 Gb/s PAM4 modulation applications. any high-speed data interconnects within data centers and between data centers, passive optical networks (PON), 5G network communications (i.e. optical core network connected to 5G wireless access) and the like.

SUMMARY OF INVENTION

The present invention addresses an improved integrated electro-absorption modulator (EAM) module circuit structure which provides a distributed architecture that provide desired signal characteristics at the final output by varying delays and gains of the various optical and electrical signal paths. The present invention further provides a distributed approach where the different circuit elements have different signals or the same signal with different delays to implement wave shaping or equalization. The distributed approach may enable summing signals to implement complex waveforms, similar to a digital to analog converter (DAC) or to implement higher order modulations like PAM4 with equalization. The present invention further utilizes distributed amplification according to contiguous or discrete electro-optical arrangements which modulate an optical signal as it travels along one or more EAM waveguides at locations contiguously or discretely distributed along the one or more EAM waveguides. The distributed EAM circuits can enable systems which modulate optical signals using less power, modulate optical signals at higher bandwidths, or both.

According to a first aspect, there is provided an electro-photonic integrated circuit comprising: a distributed EAM comprising a one or more EAM portions optically coupled to generate a modulated optical output from an optical input; a distributed driver comprising a one or more driver portions for receiving a drive signal input for the EAM from an electrical input; and; the distributed EAM being electrically coupled to the distributed driver; wherein the modulated optical output is based on the optical input and the electrical input to implement equalization.

According to an aspect the optical input and electrical each have a different propagation delay.

According to an aspect an optical propagation delay and electrical propagation delay are matched.

According to an aspect a propagation delay and a gain of the optical input and/or electrical input are combined to provide the desired signal characteristics of the modulated optical output.

According to an aspect distributed driver includes one or more of a Transmission line; a T-coil, a gain stage, a driver, a termination and a contact.

According to an aspect for each distributed EAM or EAM portion there is one or more distributed drivers or driver portions.

According to an aspect for each distributed driver or driver portion there are one or more EAMs or EAM portions.

According to an aspect an impedance of the distributed driver and characteristics of the distributed EAM are designed to match electrical propagation delay and optical propagation delay.

According to an aspect an impedance of the distributed driver and characteristics of the distributed EAM are designed to match electrical propagation delay and optical propagation delay to optimize bandwidth.

According to an aspect an impedance of the distributed driver and characteristics of the distributed EAM are designed to provide a mismatch of electrical propagation delay and optical propagation delay which increases a characteristic impedance of the distributed EAM to reduce power consumption. For example, optimization of a characteristic impedance may be selected as a trade-off relative to optimizing bandwidth.

According to an aspect an impedance of the distributed driver and characteristics of the distributed EAM are designed to provide a mismatch of electrical propagation delay and optical propagation delay which provides optimization of both a characteristic impedance and a bandwidth of the distributed EAM.

According to an aspect the distributed driver comprises a transmission line extending between the electrical input, for receiving the drive signal input, and a transmission line termination;

According to an aspect the distributed EAM has an electrical contact extending along a length of the distributed EAM and the distributed driver is connected continuously to the electrical contact.

According to an aspect further comprising a gain stage at the electrical input of the distributed driver.

According to an aspect the distributed EAM has a plurality of segmented electrical contacts extending along a length of the distributed EAM and the distributed driver is connected to the plurality of segmented electrical contacts.

According to an aspect the plurality of segmented electrical contacts comprise a plurality of fins.

According to an aspect each EAM portion has an individual electrical contact, and the distributed driver has a connection to each individual electrical contact.

According to an aspect further comprising a distributed driver comprising one or more driver portions connected in series and distributed along a transmission line, the or each driver portion receiving a portion of the drive signal and having a tap electrically connected to the or each EAM portion.

According to an aspect each tap comprises a gain stage.

According to an aspect a direction of electrical propagation is opposite to a direction of optical propagation.

According to an aspect the distributed EAM comprises a first plurality of EAM portions optically coupled in series and a second plurality of EAM portions optically coupled in series, and the first plurality of EAM portions are coupled in parallel with the second plurality of EAM portions.

According to an aspect the optical input comprises a travelling wave.

According to an aspect the distributed EAM comprises a PIN waveguide structure comprising a p-layer, an i-region and an n-layer, and wherein a contact arrangement for at least one of the p-layer and the n-layer comprises a comb structure.

According to an aspect, the distributed EAM comprises a plurality of EAM portions, and the comb structure comprises a contact transmission line extending along a length of the distributed EAM and a plurality of electrode segments, each electrode segment contacting an EAM portion, and each electrode segment being connected to the contact transmission line by an interconnect member.

According to an aspect, dimensions of the interconnect members of the comb structure comprising a length of the interconnect members selected to provide a characteristic impedance of the distributed EAM which matches an impedance of the distributed driver.

According to an aspect, dimensions of the interconnect members of the comb structure comprising a length of the interconnect members selected to optimize a characteristic impedance and a bandwidth of the distributed EAM.

According to an aspect, the comb structure comprises one of: a single metallization layer; first and second metallization layers; and multi-layer metallization.

According to an aspect the optical input comprises a laser input.

According to an aspect the electro-photonic integrated circuit comprises a laser providing said optical input.

According to a second aspect, there is provided an optical system comprising an electro-photonic integrated circuit according to the first aspect.

According to a third aspect, there is provided a method of operating an electro-photonic integrated circuit according to the first aspect, the method comprising: generating a modulated optical output from an optical input and an electrical input; wherein the modulated optical output is based on the optical input and the electrical input to implement equalization.

According to a fourth aspect, there is provided a method of operating an optical system according to the first aspect, the method comprising: generating a modulated optical output from an optical input and an electrical input; wherein the modulated optical output is based on the optical input and the electrical input to implement equalization The foregoing and additional aspects and aspects of the present invention will be apparent to those of ordinary skill in the art in view of the detailed description of various aspects and/or aspects, which is made with reference to the drawings, a brief description of which is provided next.

BRIEF DESCRIPTION OF THE DRAWINGS

The foregoing and other advantages of the invention will become apparent upon reading the following detailed description and upon reference to the drawings.

Figure 1:
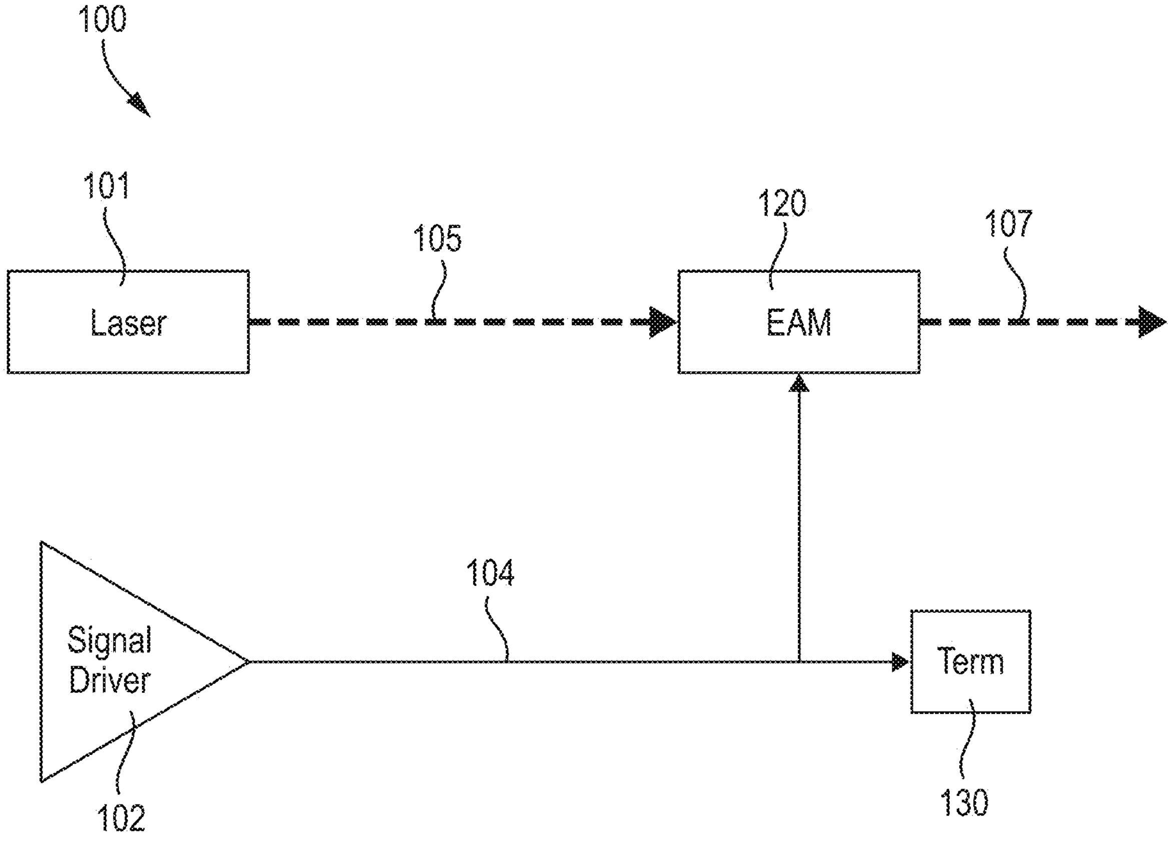
Fig. 1 (Prior Art)
FIG. 1 is a schematic block diagram of known system utilizing a typical approach to electro-absorption modulation of optical signals.

While the present invention is susceptible to various modifications and alternative forms, specific aspects or implementations have been shown by way of example in the drawings and will be described in detail herein. It should be understood, however, that the invention is not intended to be limited to the particular forms disclosed. Rather, the invention is to cover all modifications, equivalents, and alternatives falling within the scope of an invention as defined by the appended claims.

DETAILED DESCRIPTION

As noted above (in reference to the above-mentioned related application), there are a number of known approaches to electro-absorption modulation of optical signals, including the classic single ended approach, a variation thereof, and a differential approach.

FIG. 1 illustrates a known system 100 utilizing a single EAM approach to electro-absorption modulation of optical signals. A laser 101 generates an optical signal 105 (e.g. a continuous wave optical signal) to be modulated by an electro-absorption modulator (EAM) 120 for output as a modulated optical signal 107. The EAM 120 is driven by electrical driver signals 104 from a signal driver 102 via a T-junction and associated circuitry including a transmission termination 130.

A single electrical signal is coupled into the EAM 120 via the T-junction and utilized to drive the EAM 120 such that it modulates the optical signal passing therethrough. The EAM is provided with a single point electrical input to provide the electrical driver signal 104 which produces the modulated optical signal 107.

It should be understood that the foregoing and following electro-photonic implementations may be based on III-V semiconductor materials, such as an Indium Phosphide (InP)-based material system comprising binary, ternary, quaternary and other compositions of In, Ga, As, P, Al and Sb. The electronics may be based on InP-based hetero-junction bipolar transistors, which may be monolithically integrated with the photonics. Alternatively, the photonics may be hybrid, integrated or co-packaged with other electronics, such as CMOS silicon-based electronics. Generally, suitable electro-photonic and electronic material-based processes are contemplated for the high-speed applications by the aspects of the invention which follow.

Figure 2A:
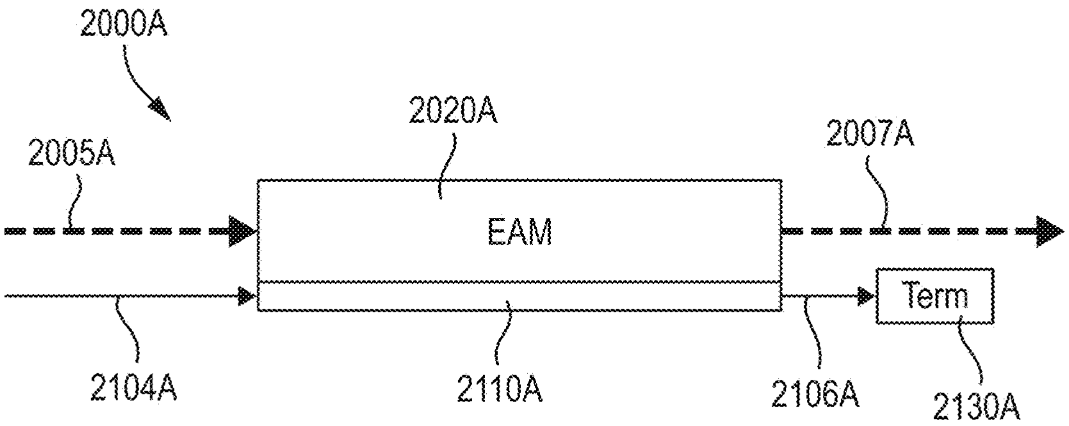
FIG. 2A is a schematic block diagram of distributed EAM module in a travelling wave configuration according to an aspect of the present invention.

An aspect of the present invention is illustrated in FIG. 2A and shows a distributed EAM configuration 2000A implemented as a travelling wave EAM with an external driver. This EAM configuration includes an EAM 2020A which receives an optical signal 2005A (e.g. a continuous wave (CW) optical signal) to be modulated from a laser (not shown) which it modulates for output as a modulated optical signal 2007A. The EAM 2020A is driven by signals 2104A from a signal driver (not shown) and associated circuitry which are external. The signal 2104A is driven by the signal driver which may include a digital signal processor (DSP) or a clock and data recovery (CDR) circuit or any other kind of signal driving circuit providing the final driving signals to the EAM 2020A. In an example the EAM is monolithically integrated with the electrical driving components.

The EAM 2020A is caused to modulate the optical signal by the electrical driver signal 2104A which traverses a contact electrical transmission line 2110A directly adjacent to the EAM 2020A as a travelling wave. The electrical driver signal 2106A after having traversed along the EAM 2020A is terminated at a transmission line termination 2130A. The transmission line 2110A acts as a biasing electrode for biasing the EAM 2020A to control the absorptive properties of the EAM 2020A along its length. This has the effect of multiple transmission points along the length of the EAM which has the effect of a distributed EAM having multiple portions. Each of the multiple portions of the EAM having the effect of one or more distributed EAMs. Such a configuration increases the highest attainable bandwidth (in a longitudinal direction along the direction of optical propagation) of the EAM, while maintaining desired levels of modulation, which can occur as both the optical signal and the electrical driver signal travel together respectively along the EAM 2020A and the contact transmission line 2110A. The transmission line appears as a characteristic impedance which has a flat frequency response with infinite bandwidth. The capacitance and inductance per unit length determine the characteristic impedance. Also, the frequency response may be altered if the electrical and optical propagation delays are not matched. Accordingly, the electrical and optical propagation delays can be matched to minimize the effect of variable frequency response. By the effect of a distributed EAM where the different elements have different signals or the same signal with different delays, it is possible to implement wave shaping or equalization in a predetermined manner.

It is noted that for the following examples not all of the features referred to in respect of FIG. 2A are repeated, but it will be clear that some or all may apply.

Figure 2B:
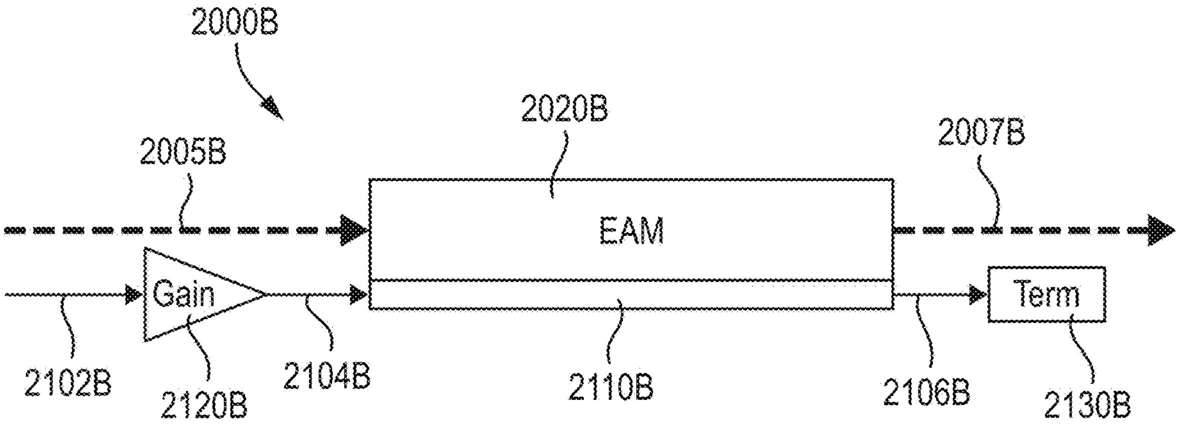
FIG. 2B is a schematic block diagram of distributed EAM module in a travelling wave configuration with an internal driver according to an aspect of the present invention.

A distributed EAM configuration 2000B implemented as a travelling wave EAM with an internal driver according to an aspect of the present invention is illustrated in FIG. 2B. This EAM configuration includes an EAM 2020B which receives an optical signal 2005B (e.g. a continuous wave optical signal) to be modulated from a laser (not shown) which it modulates for output as a modulated optical signal 2007B. The EAM 2020B is driven by an electrical signal 2104A from an internal gain stage 2120B which in turn received an electrical driver signal 2102B from an external signal driver (not shown) and associated circuitry. The internal gain stage 2120B allows for a change of impedance from the input 2102B to better match that needed for a contact transmission line 2110B formed directly adjacent the EAM 2020B. The EAM 2020B is caused to modulate the optical signal by the electrical signal 2104B which traverses the contact electrical transmission line 2110B as a travelling wave. The electrical signal 2106B after having traversed along the EAM 2020B is terminated at a transmission line termination 2130B. The transmission line 2110B acts as a biasing electrode for biasing the EAM 2020B to control its absorptive properties along its length. Such a configuration increases the highest attainable bandwidth in a longitudinal direction along the direction of optical propagation of the EAM, while maintaining desired levels of modulation, which can occur as both the optical signal and the electrical signal travel together respectively along the EAM 2020B and the contact transmission line 2110B.

The idea of distributed architecture is that the delays and gains of the various optical and electrical signal paths, when combined, provide the desired signal characteristics as the final output. The gains and delays may be controlled in such a way as to produce a predetermined output from the distributed EAM configuration. The distribution may occur in terms of a distributed EAM, a distributed driver or a combination of the two. The term distributed driver is intended to include any electronic components forming part of the circuitry necessary to produce the driving signal for each aspect of the invention having the required variations, gains and delays. The distributed driver may include one or more driver portions the or each including a Transmission line or T-coil, a gain stage, drivers, terminations and contacts as the case might be. For each distributed EAM or EAM portion there may be a distributed driver or driver portion and for each distributed driver or driver portion there may be one or more EAMs or EAM portions. The distributed EAM configuration may further be stated as a distributed EAM configuration where the distributed output is in the optical domain and the distributed input is in the electrical domain.

Figure 3A:
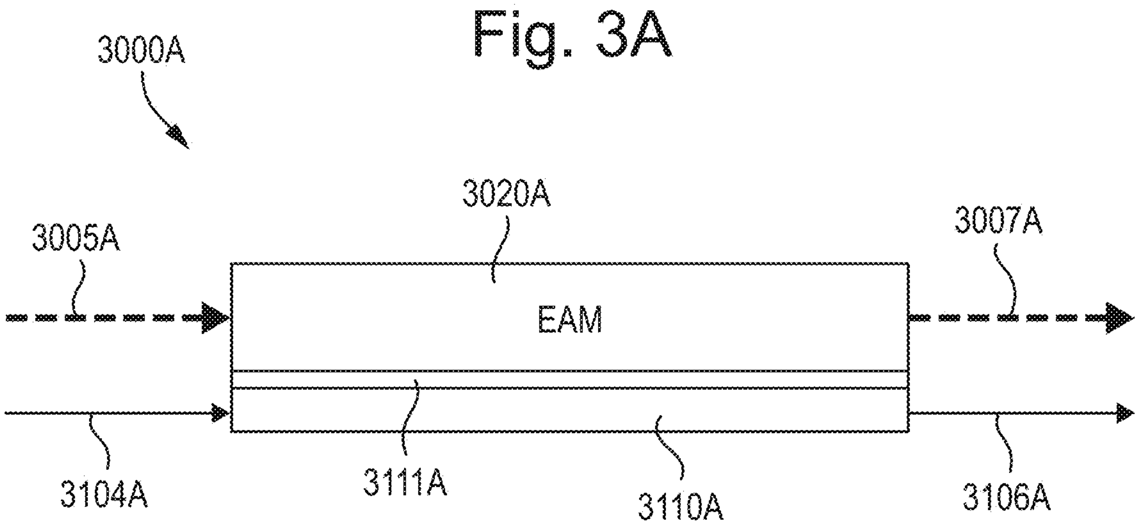
FIG. 3A is a schematic block diagram of distributed EAM module in a travelling wave configuration with continuous contact with its transmission line according to an aspect of the present invention.

With reference to FIG. 3A, a distributed EAM 3000A with a contact transmission line such as that of FIG. 2A or FIG. 2B having a continuous metal contact will now be discussed. An integrated EAM 3020A receives an optical signal 3005A (e.g. a continuous wave optical signal) to be modulated from a laser (not shown) which it modulates for output as a modulated optical signal 3007A. The EAM 3020A is driven by signals 3104A from either an external or an internal driver (not shown) and associated circuitry. The EAM 3020A is caused to modulate the optical signal by the electrical signal 3104A which traverses the contact electrical transmission line 3110A as a travelling wave. The transmission line 3110A acts as a biasing electrode for biasing the EAM 3020A to control its absorptive properties along its length. Such a configuration increases the highest attainable bandwidth in a longitudinal direction along the direction of optical propagation of the EAM, while maintaining desired levels of modulation, which can occur as both the optical signal and the electrical signal travel together respectively along the EAM 3020A and the contact transmission line 3110A. In this aspect, the contact transmission line 3110A has continuous material contact 3111A with the EAM 3020A along its length, and as such, the metal contacts that typically run along the length of EAM 3020A for biasing and the contact transmission line 3110A are one and the same. In some aspects, the impedance of the contact transmission line 3110A and the characteristics of the EAM 3020A are designed for matched optical and electrical signal propagation speeds. The electrical signals 3106A emerging from the contact transmission line 3110A may connect to a further distributed EAM module or be terminated.

Figure 3B:
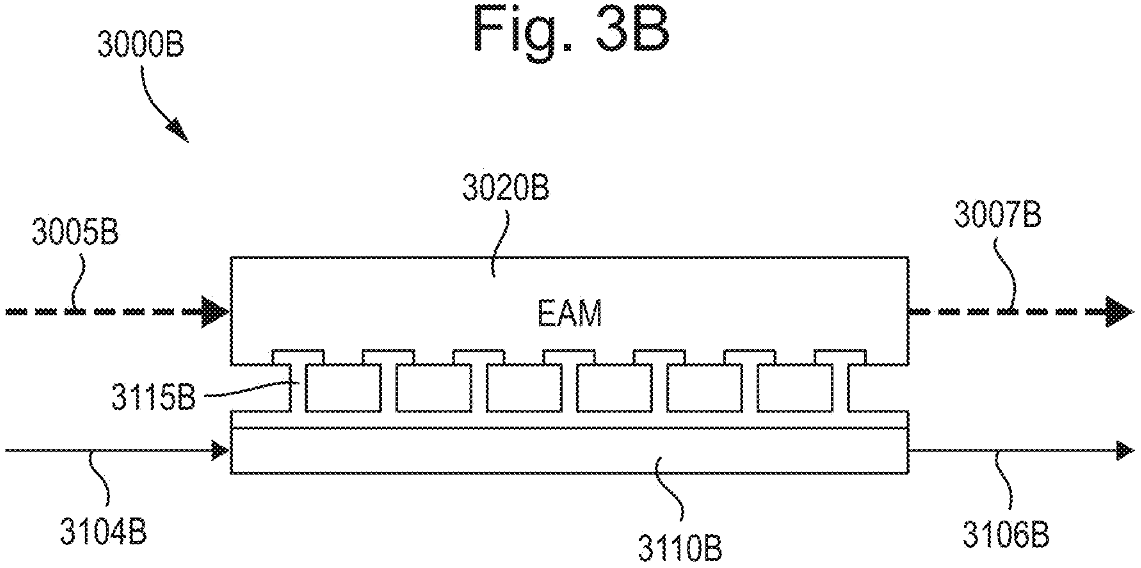
FIG. 3B is a schematic block diagram of distributed EAM module in a travelling wave configuration with discontinuous contact with its transmission line according to an aspect of the present invention.

With reference to FIG. 3B, a distributed EAM 3000B with a contact transmission line such as that of FIG. 2A or FIG. 2B having a discontinuous metal contact instead of a continuous metal contract will now be discussed. An integrated EAM 3020B receives an optical signal 3005B (e.g. a continuous wave optical signal) to be modulated from a laser (not shown) which it modulates for output as a modulated optical signal 3007B. The EAM 3020B is driven by signals 3104B from either an external or an internal driver (not shown) and associated circuitry. The EAM 3020B is caused to modulate the optical signal by the electrical signal 3104B which traverses the contact electrical transmission line 3110B as a travelling wave. The transmission line 3110B acts as a biasing electrode for biasing the EAM 3020B to control its absorptive properties along its length. Such a configuration increases the highest attainable bandwidth in a longitudinal direction along the direction of optical propagation of the EAM, while maintaining desired levels of modulation, which can occur as both the optical signal and the electrical signal travel together respectively along the EAM 3020B and the contact transmission line 3110B. In this aspect, the contact transmission line 3110B has discontinuous material contact 3115B with the EAM 3020B along its length, whereby the contact transmission line 3110B makes contact with the EAM 3020B via a series of spaced fins 3115B or contact members. This allows for the electrical delay and optical delay (propagation speeds of the respective electrical and optical signals) to be matched for a given transmission line impedance by judicious adjustment of the size, shape, and/or spacing of the fins or contact members. The electrical signals 3106B emerging from the contact transmission line 3110B may connect to a further distributed EAM module or be terminated.

Figure 4A:
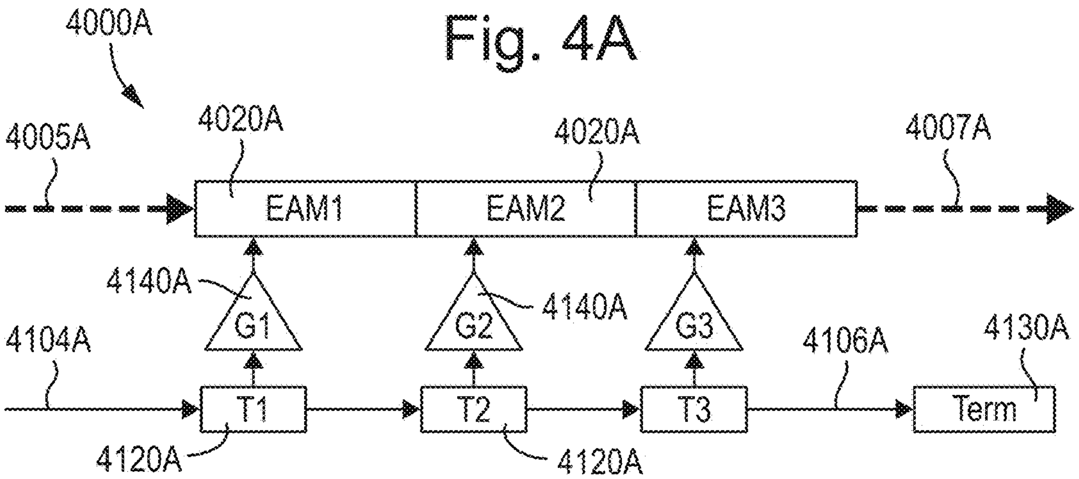
FIG. 4A is a schematic block diagram of distributed EAM module with a distributed driver providing discrete electrical biasing along one or more EAMS according to an aspect of the present invention.

A distributed EAM module 4000A utilizing distributed discrete electrical biasing of one or more EAMs according to an aspect of the present invention is illustrated in FIG. 4A. This EAM module 4000A includes one or more integrated EAMs 4020A coupled optically in series and which receive from a laser (not shown) an optical signal 4005A (e.g. a continuous wave optical signal) to be modulated, and which it modulates for output as a modulated optical signal 4007A. Portions of the one or more integrated EAMs 4020A are driven by separate signals from a series of parallel electrical gain stages 4140A which each in turn receive an electrical signal from a respective coupling circuit, e.g. T-coil (or a transmission line) 4120A coupled in series. The transmission line may comprise a single transmission line or multiple series or parallel transmission lines depending on the use case. The series of coupling circuits 4120A are coupled electrically in series and input with the input electrical driver signal 4104A received from a signal driver and associated circuitry, each one providing an electrical signal to a respective gain stage 4140A and passing on an electrical signal to the next coupling circuit in the series. The coupling circuits 4120A and the series of gain stages 4140A together comprise a distributed driver for the one or more EAMs. Each portion of the one or more EAMs 4020A is caused to modulate the optical signal by the electrical signal received from the respective gain stage 4140A, causing the optical signals to pass therethrough to obtain a modulation resulting from the successive absorptions caused within each portion as the optical signal traverses the one or more EAMs 4020A. The electrical signal 4106A after having traversed the series of coupling circuits e.g. a T-coil or a transmission line 4120A in series is terminated at a transmission line termination 4130A. Such a configuration increases the highest attainable bandwidth per EAM portion along the length of the one or more EAMs 4020A, while maintaining desired levels of modulation, resulting from the successive absorptions caused within each EAM portion. In some aspects the gain stages 4140A are coupled to each portion of the one or more EAMs with a connection which conforms to a typical electrode application of biasing voltage.

Figure 4B:
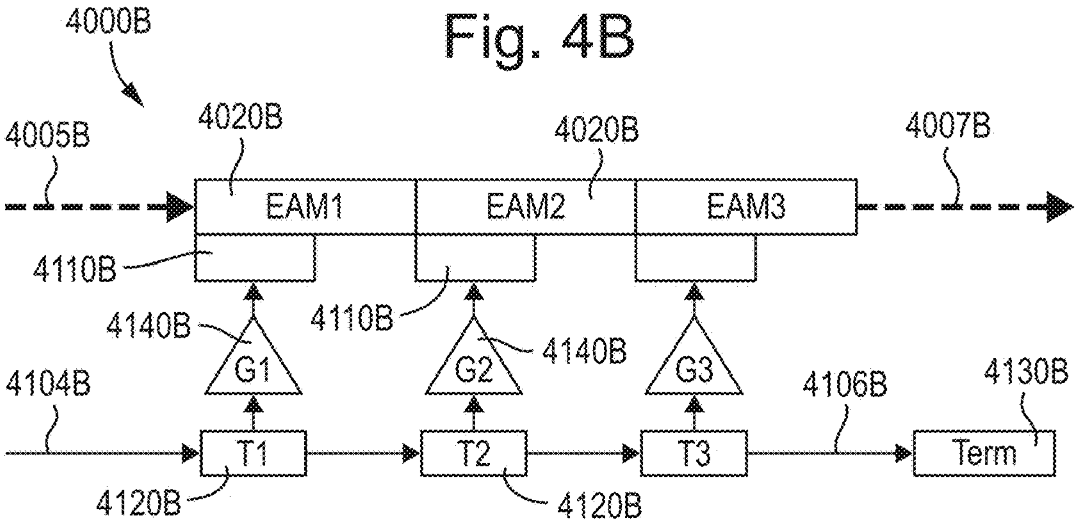
FIG. 4B is a schematic block diagram of distributed EAM module with a distributed driver providing discrete electrical biasing with separate travelling wave implementations along one or more EAMS according to an aspect of the present invention.

Referring also to FIG. 4B, in a variation of the aspect of FIG. 4A, each of the gain stages 4140B are coupled to each portion of the one or more EAMs 4020B with a connection in the form of contact transmission line 4110B along a length of each EAM portion implementing a separate travelling wave biasing configuration at each EAM portion similar to the aspects depicted in FIG. 2A. In such an aspect the highest possible bandwidth is increased even more than the aspect of FIG. 4A. Each of these transmission lines themselves may optionally be terminated, but at the cost of extra power consumption.

Figure 4C:
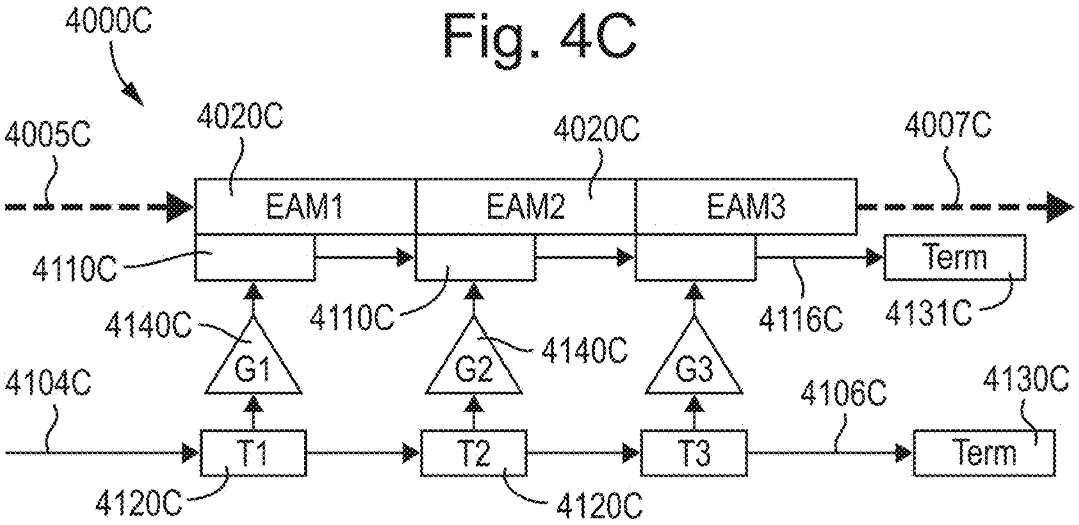
FIG. 4C is a schematic block diagram of distributed EAM module with a distributed driver providing discrete electrical biasing with a series of travelling wave implementations along one or more EAMS according to an aspect of the present invention.

Referring also to FIG. 4C, in a variation of the aspect of FIG. 4B, the contact transmission lines 4110C are coupled in series, the electrical signal input to each capable of proceeding to the next one, implementing a series of chained travelling wave biasing configurations, each similar to the aspects depicted in FIG. 2A but with only one termination at the end of the chain. In such an aspect the impedances are designed so that no signal travels in the opposite direction. A single termination 4131C terminates the electrical signal 4116C which emerges from the series of contact transmission lines 4110C. In such an aspect, a tapered distributed approach may be used, in which each EAM portion and/or gain stage are of different sizes to obtain different magnitudes of absorption. This can result in lower power consumption than the aspect of FIG. 4B, due to the use of only one termination 4131C for the series of contact transmission lines 4110C, and due to the outputs of all the gain stages summing electrically as they pass down the series of contact transmission lines 4110C, generating a larger signal. As custom design and configuration of multiple EAMs or EAM portions is enabled either in series and/or in parallel summing can be implemented in the optical domain. Summing of optical signals in the optical domain improves equalization and wave-shaping.

Figure 5A:
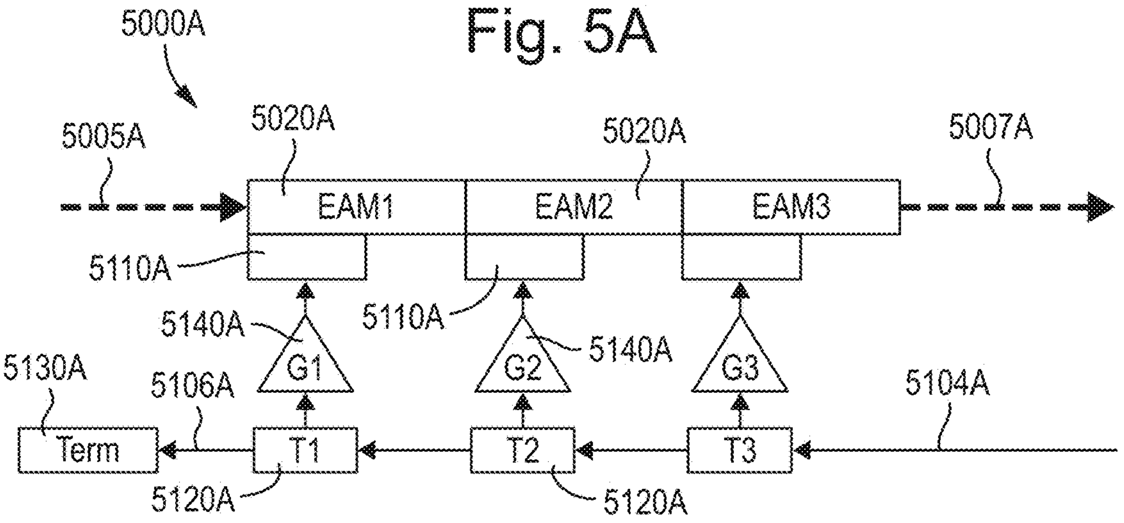
FIG. 5A is a schematic block diagram of distributed EAM module with a distributed driver providing discrete electrical biasing in reverse order with a series of travelling wave implementations along one or more EAMS according to an aspect.

Referring also to FIG. 5A, in a variation of the aspect of FIG. 4B, the electrical driver signal 5104A input to the series of coupling circuits e.g. T-coils or Transmission lines 5120A is in the opposite direction to the direction of the propagation of the optical signal through the one or more EAMs 5020A. The electrical driver signal from the external driver 5104A therefore is received at each gain stage and provided to the contact transmission line 5110A for biasing each EAM portion in a reverse order compared to the order that the optical signal traverses those EAM portions. In such an aspect, wave shaping or equalization may be achieved. For example, in the module 5000A of FIG. 5A, the gain stage G3 could operate as a precursor, G2 could operate as the main cursor, and G1 could operate as the post cursor to implement a three-tap equalizer. In a further variation of FIG. 5A (and also FIG. 4B) different delays rather than reverse direction of the electrical driver signal from the driver 5104A could be used to implement wave shaping or equalization.

Figure 5B:
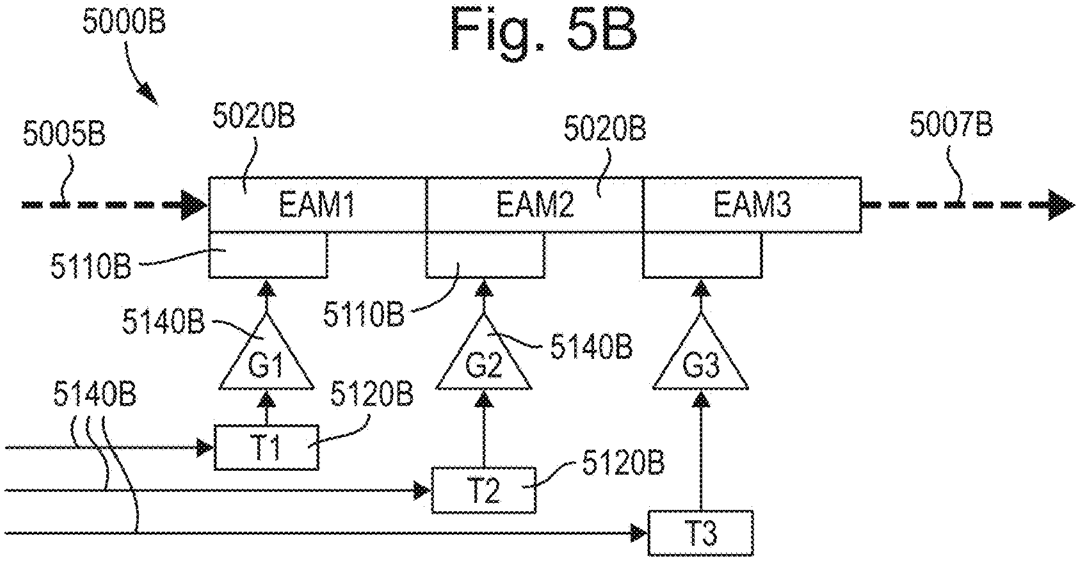
FIG. 5B is a schematic block diagram of distributed EAM module with a distributed driver providing discrete electrical biasing with separate electrical signals to separate travelling wave implementations along one or more EAMS according to an aspect of the present invention.

Referring also to FIG. 5B, in a variation of the aspect of FIG. 4B, separate electrical driver signals 5104B from separate external drivers are input to separate respective coupling circuits e.g. T-coils or transmission lines 5120A. In such an aspect, the separate electrical driver signals 5104B could be different signals arranged to sum to various signals to implement complex waveforms, similar to a DAC or to implement higher order modulations like PAM4 with equalization. In some aspects, each element (gain of each gain stage or size of respective EAM portion) can be arranged to provide the appropriate weighting for each bit, i.e. to impose an appropriately different amount of modulation to the optical signal. Although not shown, the electrical inputs or coupling circuits would typically be terminated.

Figure 5C:
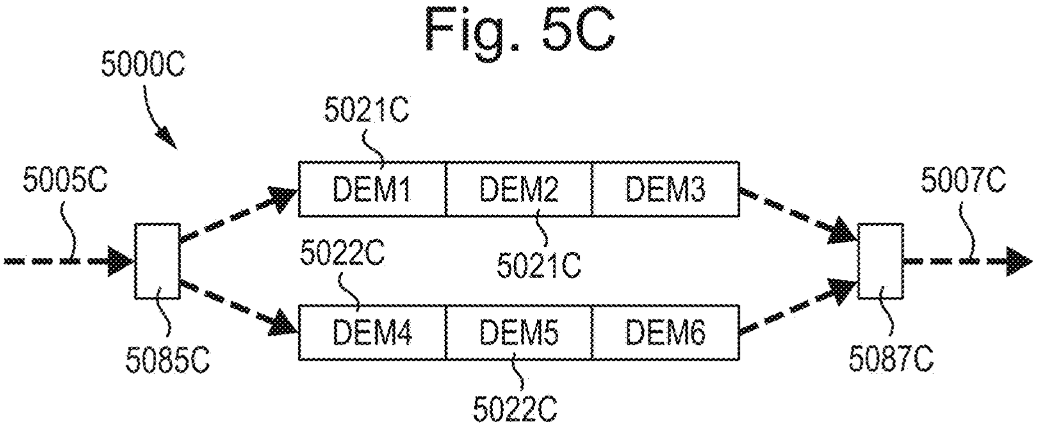
FIG. 5C is a schematic block diagram of an example distributed EAM system including a network of distributed EAM modules arranged in parallel and in series according to an aspect of the present invention.

It should be understood that in general an EAM system 5000C can utilize distributed EAM modules in series or in parallel or in any combination thereof, one example of which is illustrated in FIG. 5C. The input optical signal 5005C from the laser is split by a first splitter 5085C to traverse two branches each including a series of distributed EAM modules (DEMs) 5021C 5022C. The optical signals modulated by each series of DEMs are combined in a second splitter 5087C to generate the final modulated optical signal 5007C.

Figure 6:
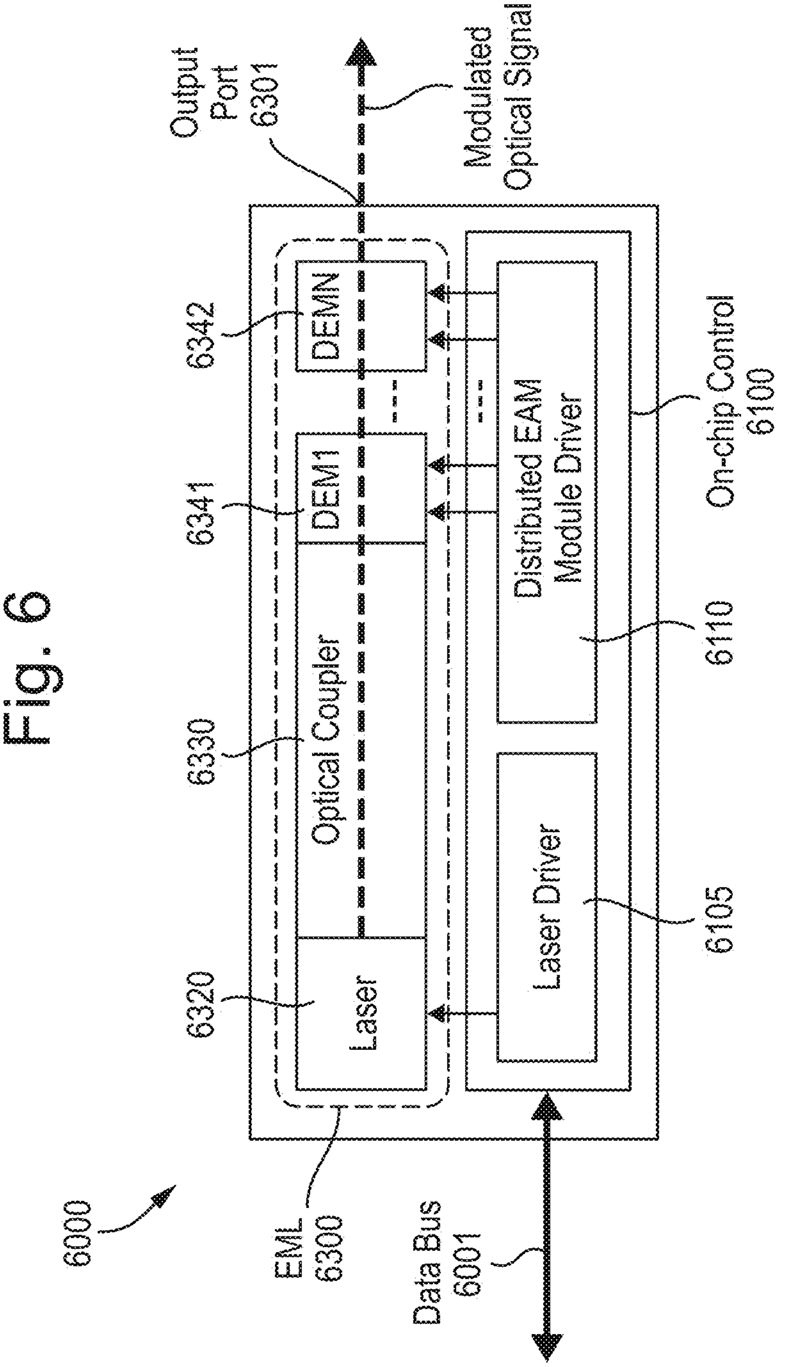
FIG. 6 is a schematic block diagram illustrating a system employing distributed EAM modules according to an aspect of the present invention.

Illustrated in FIG. 6 is an integrated system 6000 including an electro-absorption modulated laser (EML) 6300 and on-chip control 6100 for driving the EML 6200 according to an aspect.

The EML 6300 includes a laser (e.g. DFB laser) for generating a continuous wave optical signal which is coupled via an optical coupler 6330 (e.g. laterally coupled through a passive waveguide or vertically coupled by a laterally tapered vertical optical coupler) to one or more distributed EAM modules (DEM) 6341 6342, such as any of those describe above, each of which is responsible for contributing to a final total modulation of the modulated optical signal emitted from the output port 6301. In accordance with communications over the data bus 6001 from a larger transmitter and/or receiver system in which the system 6000 is implemented, the on-chip control 6100 drives the laser 6320 with a laser driver 6105 and drives the one or more distributed EAM modules 6341 6342 with a distributed EAM module driver 6110 corresponding to the external signal drivers mentioned above.

It should be understood that although FIG. 6 illustrates an optical coupler 6330 between the laser 6320 and the one or more distributed EAM modules 6341 6342, in some aspects no optical coupler is present or required. The laser input to the one or more distributed EAM modules may be provided from an external laser. The laser and EAM of an EML may be monolithically integrated, or hybrid integrated, e.g. as described in U.S. patent application Ser. No. 17/687,803 (U.S. Pat. No. 12,272,925), and optionally the driver electronics may also be monolithically integrated or hybrid integrated.

Figure 7A:
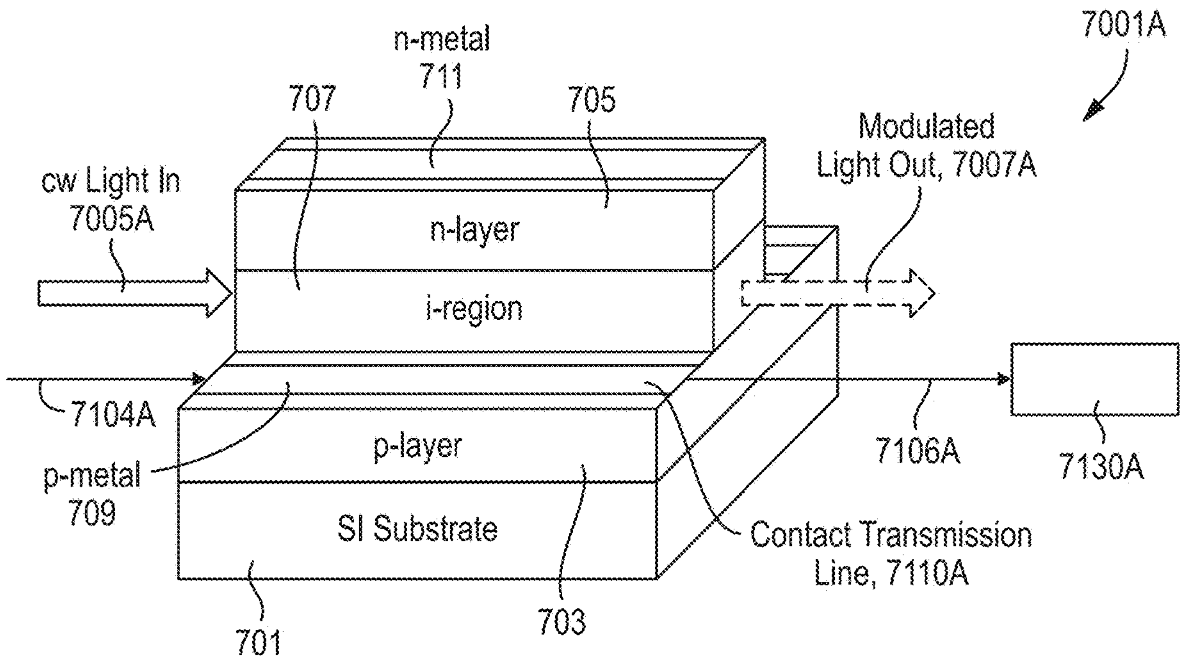
FIG. 7A is a schematic diagram of a distributed EAM module showing a contact arrangement according to an aspect of the invention.

FIG. 7A is a schematic diagram of a layer structure of a distributed EAM module 7001A showing a contact arrangement according to an aspect of the invention, such as that shown in FIG. 3A, wherein the p-electrode and n-electrode are continuous. In this implementation, the EAM module comprises a PIN waveguide structure comprising a p-layer 703, and an i region (active absorption region) and an n-layer 705, formed on a semi-insulating (SI) substrate 701. For example, EAM PIN waveguide structures are described in U.S. patent application Ser. No. 17/687,803 and U.S. patent application Ser. No. 19/317,684 which are incorporated herein by reference in their entirety. For example, the PIN waveguide structure of the EAM module may be fabricated from an InP-based semiconductor material system, wherein a substrate is semi-insulating InP, e.g. Fe:InP, the p-layer comprises p-InP, the n-layer comprises n-InP, and the i-region is a multi-quantum well (MQW) structure.

As illustrated schematically in FIG. 7A, the n-layer 705 is on top and the p-layer 703 is beneath the i-region 707. A contact transmission line 7110A comprising p-metal 709 is provided on the p-layer 703 adjacent to the ridge of the PIN waveguide structure. The contact transmission line 7110A receives an electrical input driver signal 7104A. The EAM 7001A is caused to modulate the input optical signal 7005A by the electrical driver signal 7104A which traverses a contact electrical transmission line 7110A directly adjacent to the EAM 2020A as a travelling wave. The electrical driver signal 7106A after having traversed along the EAM 7001A is terminated at a transmission line termination 7130A. The transmission line 7110A acts as a biasing electrode for biasing the EAM 7001A to control the absorptive properties of the EAM 7001A along its length. A top contact comprising n-metal 711 is provided on the n-layer 705 on top of the ridge.

It will be appreciated that the n-layer, the p-layer and the i-region may each comprise multiple layers, and dimensions and relative thickness are shown schematically to illustrate the layers, and dimensions are not to scale.

By way of example only, the ridge of the PIN waveguide 7001A may be in the order of a few microns wide, e.g. ~2 μm wide. The length of the distributed EAM module may be in the range of tens of microns to more than 100 μm long, e.g. a length in the range of the order of ~40 μm to ~120 μm. An MQW i-region comprises a plurality of barrier layers and wells, each of thickness in the order of ~10 nm: by way of example only, the i-region may have a thickness in the order of 200 nm or 300 nm, depending on the number of barrier layers and well layers. The i-region may be undercut relative to the width of the ridge, to reduce the width of the i-region, to reduce the device capacitance of the i-region.

For an InP-based waveguide structure, the p-layer 703 may comprise p-InP and the n-layer 705 may comprise n-InP. These layers have a thickness in the order of ~1 μm or a few microns. The p-metal layer 709 and the n-metal layer 711 may comprise a single metallization layer or multiple metallization layers. Metal layers may comprise, for example, a gold alloy, aluminum, copper or other metals or metal alloys compatible with an InP-based semiconductor material system. Interconnect metallization comprising these materials or one or more other metallization layers and intermetal dielectric layers (not illustrated in this drawing) are provided to form electrical interconnects between the distributed EAM module 7001A and driver electronics.

Figure 7B:
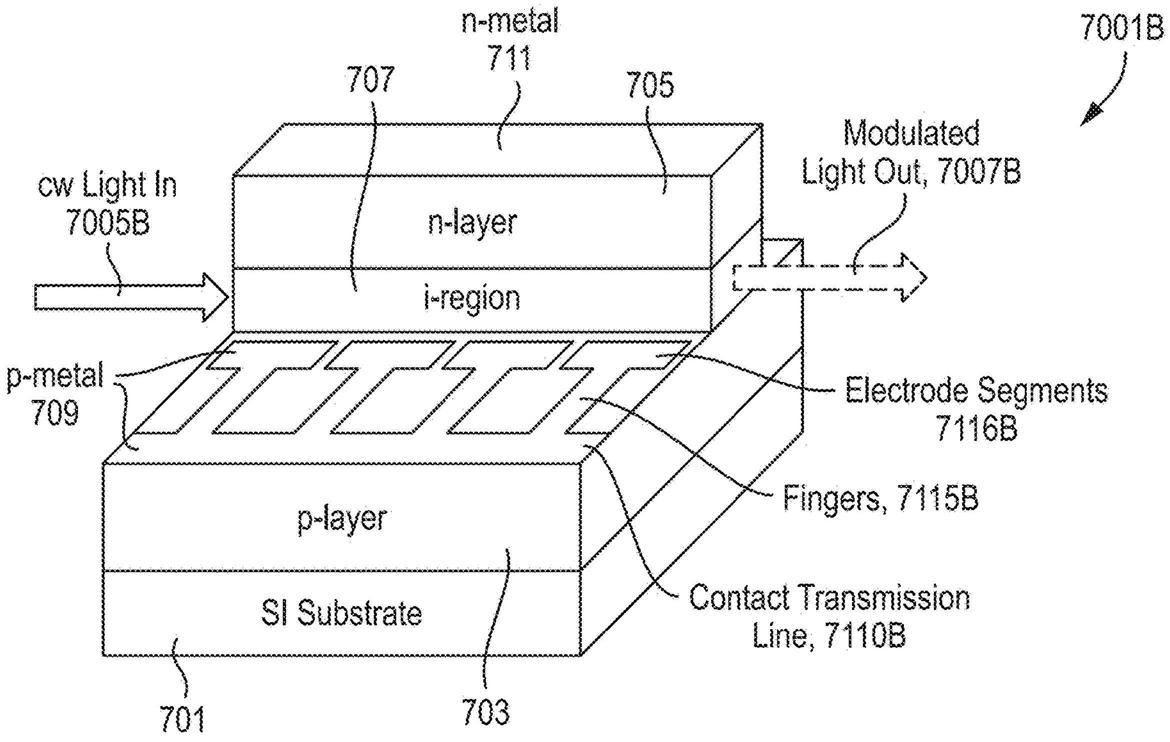
FIG. 7B is a schematic diagram of a distributed EAM module showing a contact arrangement having a comb structure according to an aspect of the invention.

FIG. 7B is a schematic diagram of a layer structure of a distributed EAM module 7001B showing a contact arrangement having a segmented structure, which may be described as a comb structure or fin structure, according to an aspect of the invention, such as that shown in FIG. 3B. The PIN layer structure of the PIN waveguide 7001B shown in FIG. 7B is similar to that of the PIN waveguide structure 7001A shown in FIG. 7A, and like components are labelled with the same reference numbers with a suffix B instead of suffix A. As illustrated in FIG. 7B, the n-layer 705 is on top and the p-layer 703 is beneath the i-region 707. A contact transmission line 7110B comprising p-metal 709 is provided on the p-layer 703 adjacent to the ridge of the PIN waveguide structure.

In this aspect, the contact transmission line 7110B has a fin-like structure, that resembles a comb. The contact transmission line 7110B, which acts as a biasing electrode is laterally spaced from the ridge of the waveguide, and is connected to a plurality of segmented electrode portions 7116B, by a respective number of contact members 7115B, which may be described as fins or fingers or tines. The contact transmission line can therefore be described as having a comb-like structure with a plurality of tines or fingers. A top contact comprising n-metal 711 is provided on the n-layer 705 on top of the ridge.

As for the structure shown in FIG. 7A, it will be appreciated that the n-layer, the p-layer and the i-region may each comprise multiple layers, and dimensions and layer thicknesses are shown schematically to illustrate the layer structure, and dimensions are not to scale. By way of example only, the ridge of the PIN waveguide 7001B may be in the order of 2 μm wide, and tens of microns to more than 100 μm long, e.g. a length in the range of ~40 μm to ~120 μm. The MQW i-region comprises a plurality of barrier layers and wells, each of thickness in the order of 10 nm: by way of example only, the i-region may have a thickness in the order of 200 nm or 300 nm, depending on the number of barrier layers and well layers. The i-region may be undercut to reduce the width of the i-region to reduce the capacitance. For an InP-based waveguide structure, the p-InP and the n-InP layers have a thickness in the order of ~1 μm or a few microns. The p-metal layer and the n-metal layer may comprise metal and metal alloys compatible with an InP-based semiconductor material system. Interconnect metallization comprising these layers or one or more other metallization layers and intermetal dielectric layers (not illustrated in this drawing) are provided to form electrical interconnects between the distributed EAM module 7001B and driver electronics.

Figure 7C:
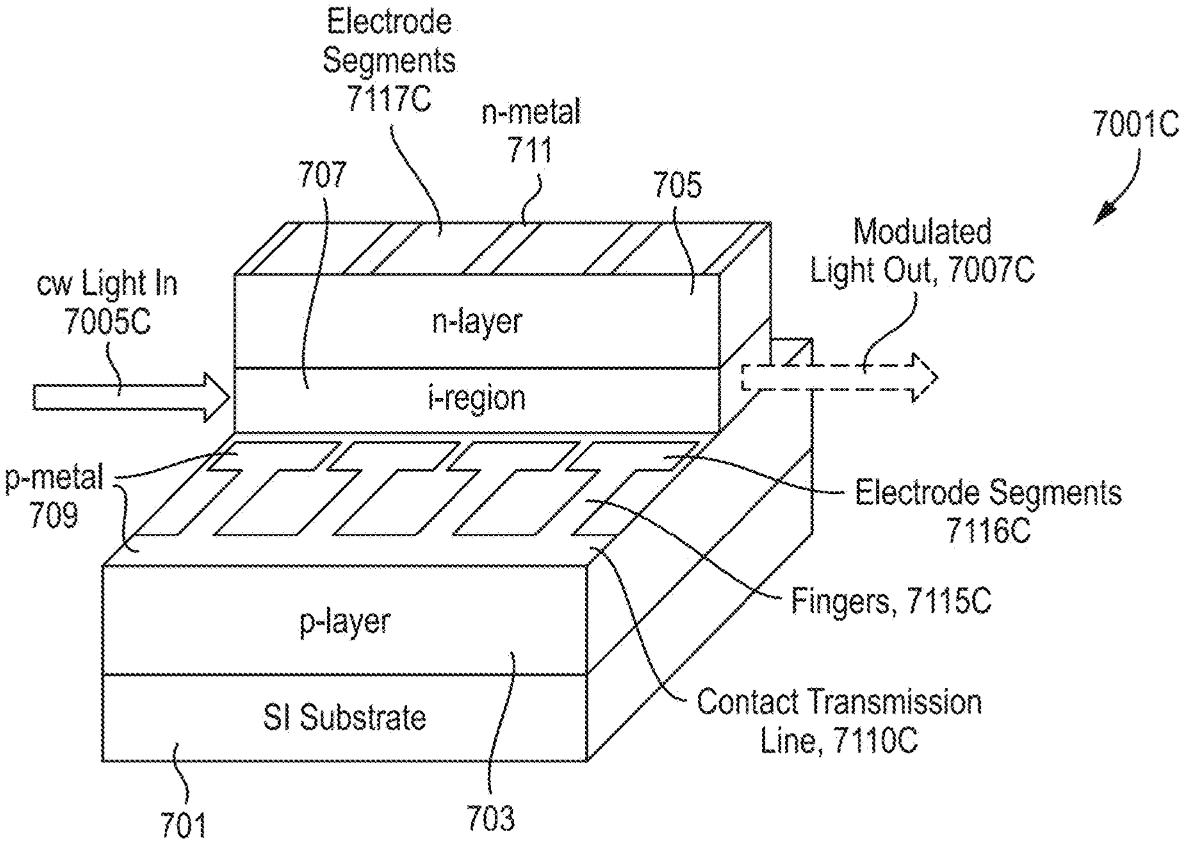
FIG. 7C is a schematic diagram of a distributed EAM module showing a contact arrangement comprising a comb structure according to an aspect of the invention.

FIG. 7C is a schematic diagram of a layer structure of a distributed EAM module 7001C according to an aspect of the invention, having a contact arrangement comprising a segmented structure, which may be described as a comb structure or fin structure. The p-contact structure is similar to that shown in FIG. 7B, and elements are labelled with the same reference numbers with suffix C (i.e. elements 7110C, 7115C and 7116C). The n-contact structure differs from that shown in FIG. 7B because the n-contact is segmented or discontinuous and comprises a plurality of electrode segments 7117C.

Figure 8A:
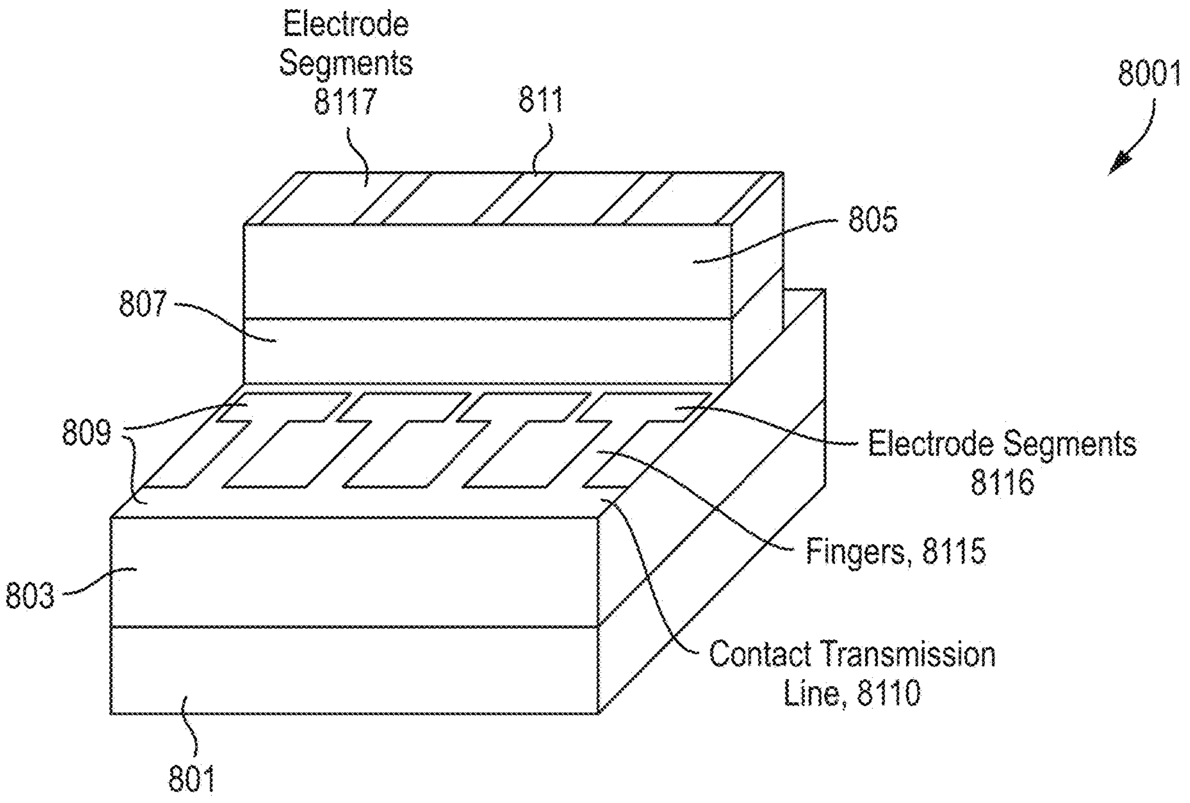
FIG. 8A is a schematic diagram of a distributed EAM module showing a contact arrangement comprising a comb structure according to an aspect of the invention.

FIG. 8A is a schematic diagram of a distributed EAM module comprising: a PIN waveguide structure having a contact arrangement comprising a comb structure according to an aspect of the invention; a substrate 801, such as a semi-insulating InP substrate; a layer 803 of a first conductivity type; a layer 805 of a second conductivity type; and a i-region 807 (active region), which may be a MQW i-region. A metal layer 809 is patterned to form a contact arrangement having a comb structure comprising a contact transmission line 8110, electrode segments 8116, and fingers or fins 8115 connecting the contact transmission line 8110 to the electrode segments 8116. For example, for a p-down PIN waveguide structure, metal layer 809 comprises p-metal, and metal layer 811 comprises n-metal The PIN waveguide structure may be fabricated as p-up or p-down. Accordingly, for a p-down PIN waveguide structure layer 803 is a p-layer and layer 805 is an n-layer; or for a p-up PIN waveguide structure, layer 803 is an n-layer and layer 805 is a p-layer.

Figure 8B:
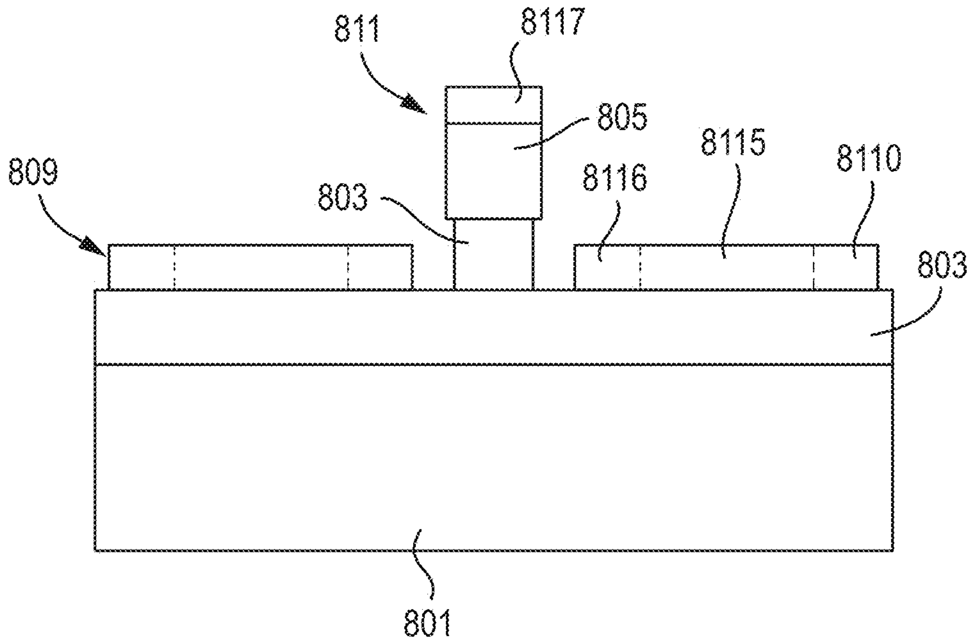
FIG. 8B is a schematic cross-sectional diagram of the distributed EAM module of FIG. 8A.

FIG. 8B is a schematic cross-sectional diagram of the distributed EAM module of FIG. 8A, wherein the electrode transmission line, comprising contact transmission line 8110, segmented electrodes 8116 and contact members (which may be referred to as fins or fingers or tines) 8115 are formed from a first metal layer 809. The top electrode segments 8117 are formed from metal layer 811. Metal layers 809 and 811 may be a p-metal layer or an n-metal layer depending on whether the PIN waveguide structure is p-down or p-up.

Figure 8C:
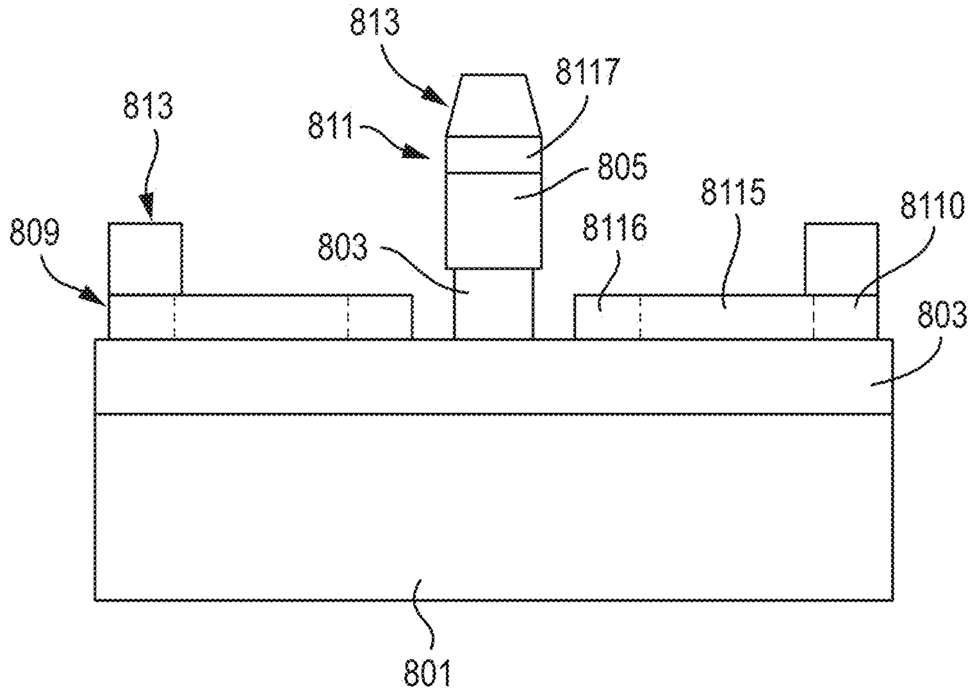
FIG. 8C is a schematic cross-sectional diagram of a distributed EAM module wherein the contact arrangement comprises a comb structure fabricated from a plurality of metal layers according to an aspect of the invention.

FIG. 8C is a schematic cross-sectional diagram of a distributed EAM module according to an aspect of the invention comprising a contact arrangement having a comb structure fabricated from first and second metal layers. For example, a second metal layer 813 is added to the structure shown in cross-section in FIG. 8B. For example, for a p-down PIN waveguide structure, metal layer 809 comprises p-metal, and metal layer 811 comprises n-metal, and metal 813 comprises at least one other metal layer.

Figure 8D:
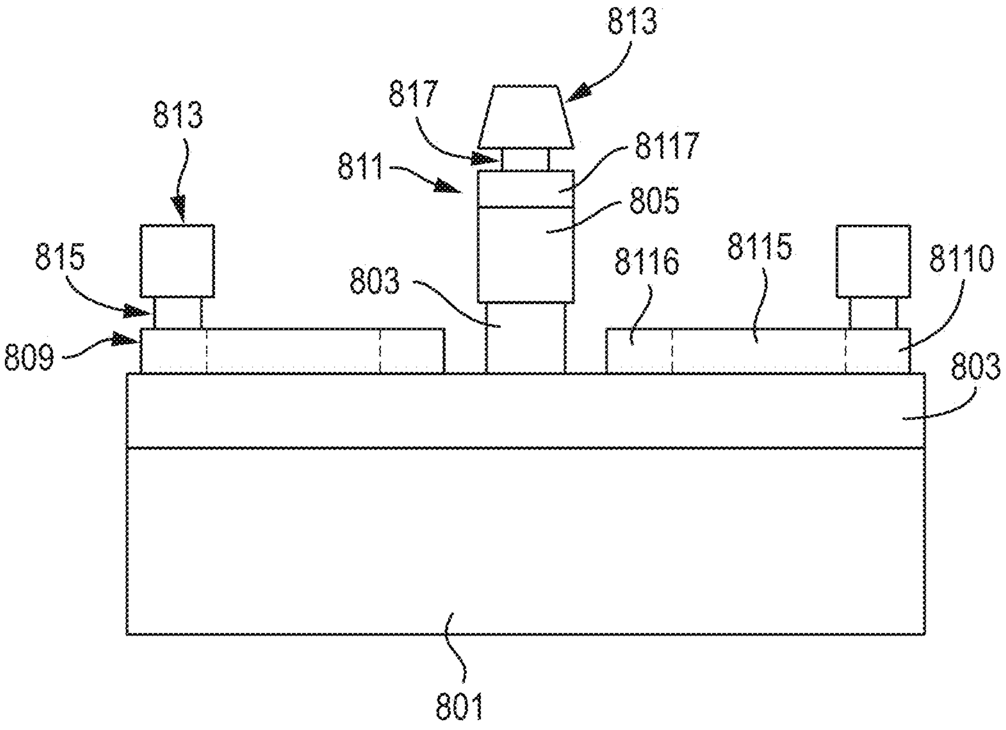
FIG. 8D is a simplified schematic plan view of a layout for a distributed EAM module wherein the contact arrangement comprises a comb structure fabricated from a plurality of metal layers according to an aspect of the invention.

FIG. 8D shows a variant of the device structure shown in FIG. 8C wherein metal layer 809 is interconnected to metal layer 813 by conductive vias 815, and metal layer 811 is interconnected to metal layer 813 by conductive vias 817. Corresponding elements in FIGS. 8A to 8D, and the following FIGS. 8E and 8F are labelled with the same reference numerals.

Figure 8E:
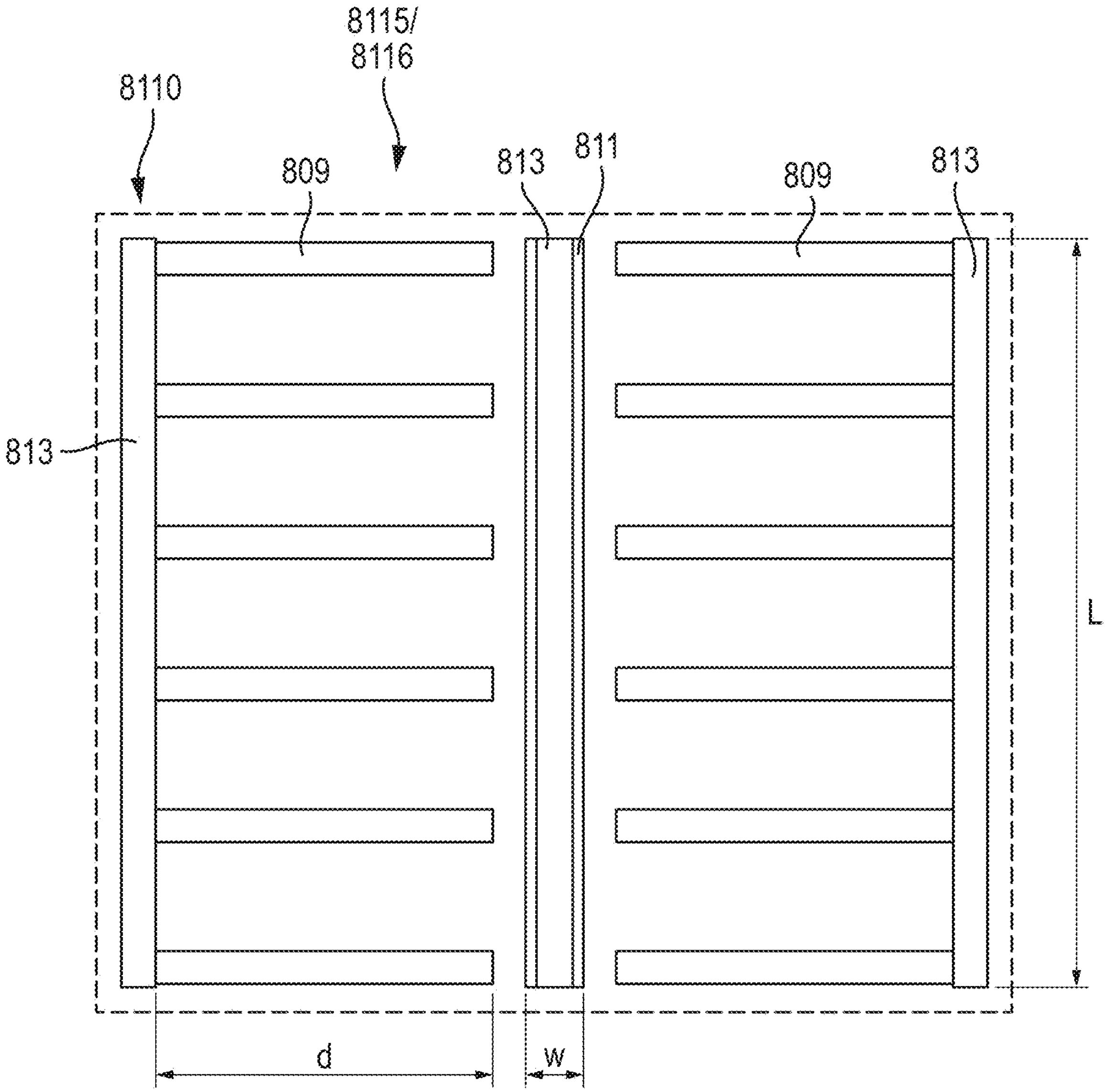
FIG. 8E is a simplified schematic plan view of a layout for a distributed EAM module wherein the contact arrangement having a comb structure comprising a plurality of metallization layers according to an aspect of the invention.
Figure 8F:
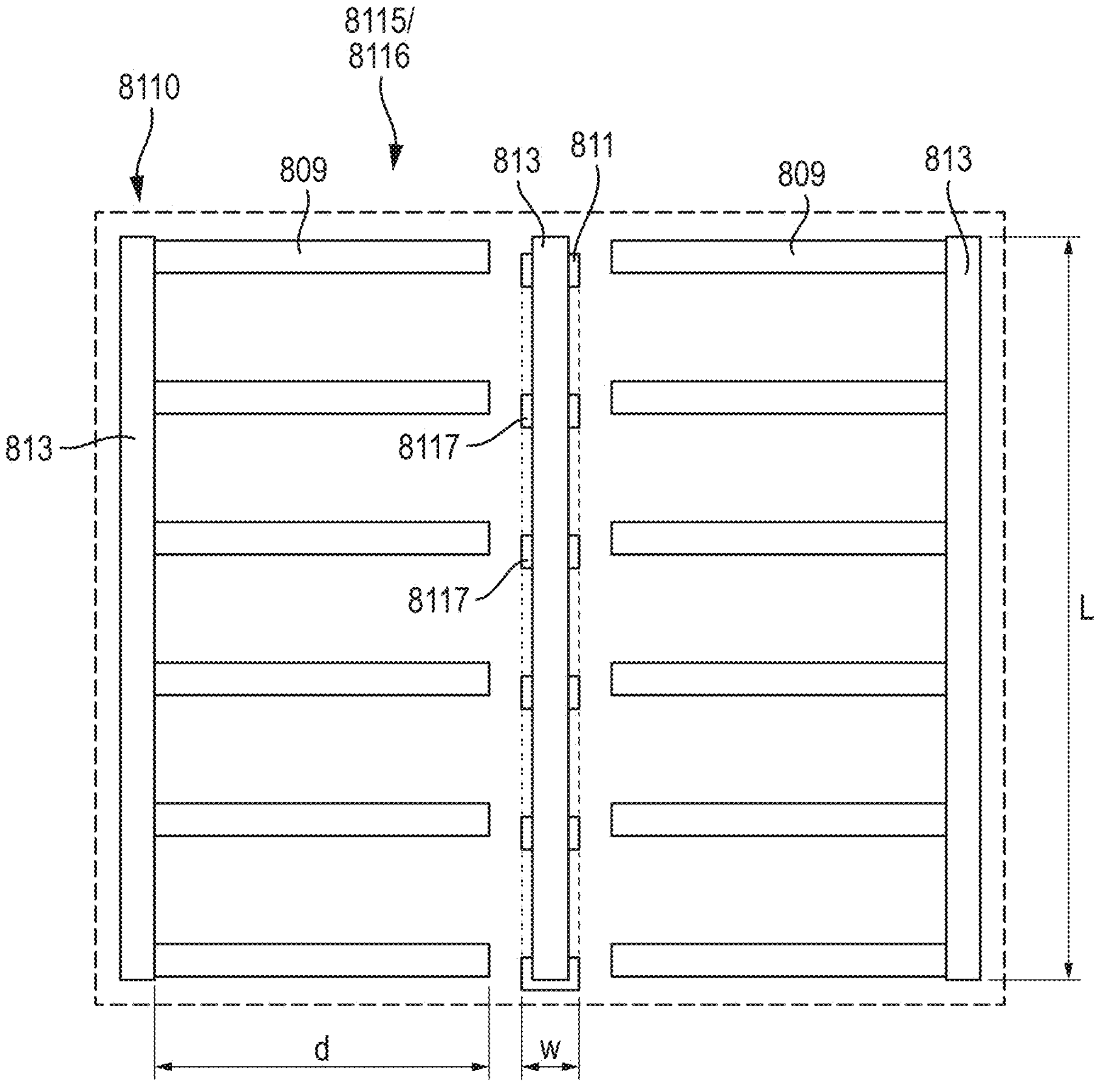
FIG. 8F is a simplified schematic plan view of a layout for a distributed EAM module wherein the contact arrangement having a comb structure comprising a plurality of metallization layers according to an aspect of the invention.

FIG. 8E is a simplified schematic plan view of a metallization pattern for a distributed EAM module wherein the contact arrangement has a comb structure comprising metal layers 809 and 811, a second, overlying, metal layer 813 according to an aspect of the invention. For example, the metal 809 may comprise p-metal, the metal 811 may comprise n-metal and metal 813 may comprise a first interconnect metallization layer. The length L of the EAM module, and the dimensions of the elements of the comb structure of the contact arrangement, e.g. the length d of the p-metal fingers, are selected to optimize performance characteristics of the distributed EAM module. For example, increasing the length of the p-metal fingers increases the inductance and delay of the electrical signal, thereby increasing the characteristic impedance.

For a conventional EAM as illustrated in FIG. 1, utilizing a single EAM approach to electro-absorption modulation of optical signals, the EAM 120 is driven by electrical driver signals 104 from a signal driver 102 via a T-junction and associated circuitry including a transmission termination 130. By way of example, the EAM waveguide may be structured as described in U.S. patent application Ser. No. 17/687,803 and U.S. patent application Ser. No. 19/317,684. A single EAM waveguide is capacitive, which limits the bandwidth, the EAM waveguide is structured to reduce its capacitance to increase bandwidth. As described in U.S. Ser. No. 19/317,684, for example, to increase the f_3 dB bandwidth, it may be desirable to reduce the width of the i-region to provide a lower intrinsic capacitance per unit length, e.g. ≤0.85 fF/μm or preferably ≤0.70 fF/μm. For example, for an EAM having a length of 50 μm, the device capacitance is <50 fF or <40 fF, which enables high-speed modulation with an acceptable dynamic extinction ratio (ER). On the other hand, this EAM device structure has low impedance, e.g. ~20Ω, which requires a driver providing a lot of current and power for high-speed operation.

As mentioned above, a distributed EAM module according to aspects of the invention described herein provides for the EAM to be driven like a transmission line along the EAM, which extends the bandwidth, so that the total EAM device capacitance has an insignificant impact on the bandwidth. Additionally, a contact arrangement comprising a comb-like structure allows for the metal contact arrangement to be designed to increase the impedance of the transmission line to reduce the drive current and driver power consumption. Increasing the impedance of the transmission line enables high speed operation, e.g. targeting 336 Gbps and 448 Gbps operation, having a reasonable driver power consumption. For the distributed EAM module, the length of the EAM has negligible impact on bandwidth. This means that to achieve a required extinction ratio, the length of the EAM can be increased and the voltage swing can be reduced, which further relaxes constraints on driver design.

FIG. 8F is a simplified schematic plan view of a layout for a distributed EAM module wherein the contact arrangement having a comb structure according to an aspect of the invention. The contact arrangement in FIG. 8F differs from that shown in FIG. 8E in that the metal layer 811 of the top contact structure is segmented or discontinuous. This interconnect structure provides for integration of one or more EAM modules which may be driven as described with respect to the distributed EAM modules shown in FIGS. 4A, 4B, 4C, 5A, 5B, 5C.

For distributed EAM modules according to some aspects, it may be desirable to structure the contact structure to adjust or match propagation delays of optical signals and electrical signals to allow for equalization and wave-shaping. Designing the contact structure to increase the characteristic impedance, e.g. by increasing the length of the tines, to move the traces further apart, will cause a mismatch in optical and electrical delays, but the increased impedance reduces the power consumption. In an example embodiment, the impedance may be increased e.g. from ~20Ω to ~40Ω without degrading the bandwidth too much, to allow for use of a 4562 custom driver. A reduction in characteristic impedance requires correspondingly less drive current and reduces driver power consumption. It improves the return loss, resulting in smaller reflections and better eye metrics.

Figure 9A:
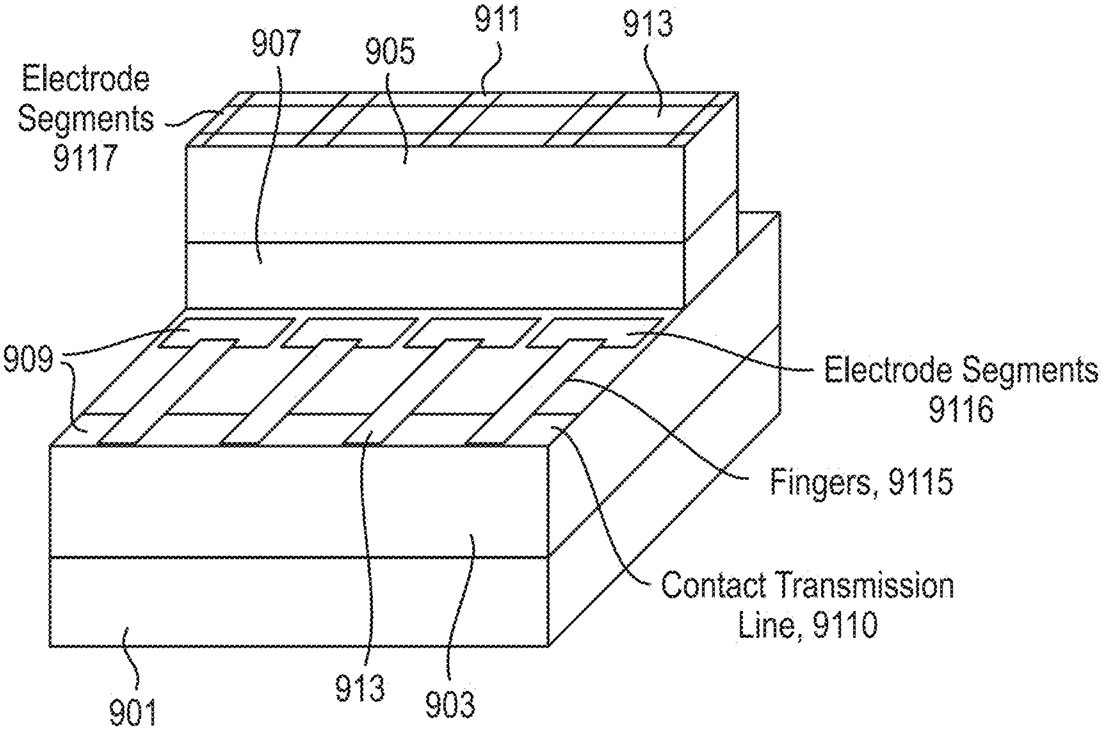
FIG. 9A is a schematic diagram of a distributed EAM module showing a contact arrangement having a comb structure according to an aspect of the invention.

FIG. 9A is a schematic diagram of a distributed EAM module showing a contact arrangement having a comb structure according to an aspect of the invention, and comprising a substrate 901; a layer 903 of a first conductivity type; a layer 905 of a second conductivity type; and an i-region 907. A first comb electrode structure comprises a contact transmission line 9110 and segmented electrodes 9116 which are defined by a metal layer 909. which are interconnected by contact members (fins or fingers) 9115 defined by an overlying metal interconnect layer, e.g. a first interconnect metallization layer 913.

Figure 9B:
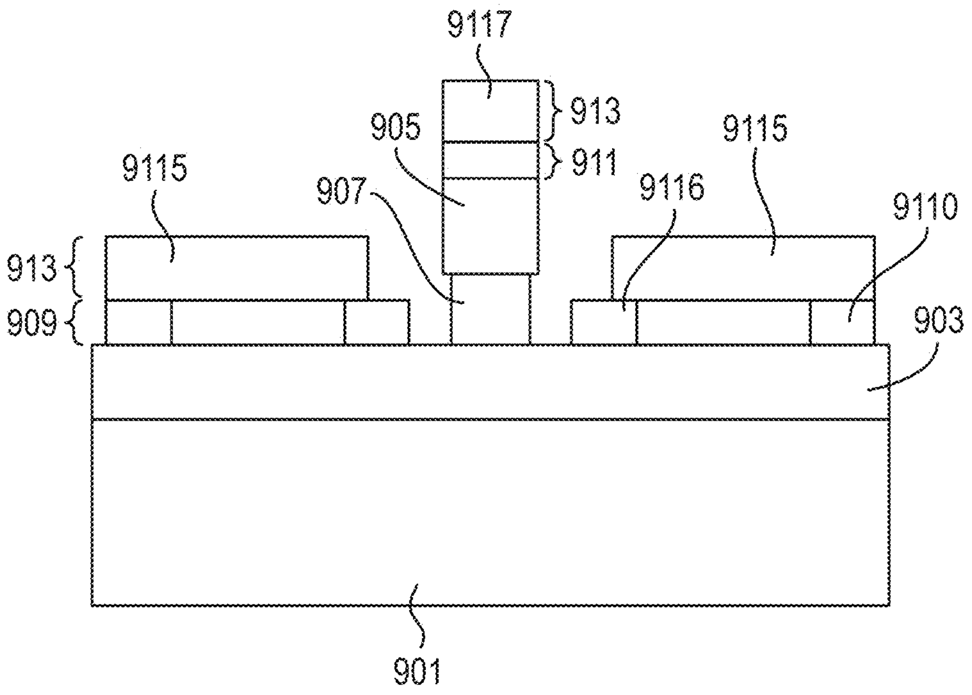
FIG. 9B is a schematic cross-sectional diagram of the distributed EAM module shown in FIG. 9A.

FIG. 9B is a schematic cross-sectional diagram of the distributed EAM module according to an aspect of the invention to illustrate interconnection of interconnection of the contact transmission line 9110 and segmented electrodes 9116 which are defined by a metal layer 909, and contact members (fins or fingers) 9115 which are defined by an overlying metal interconnect layer, e.g. a first metallization layer 913. Other elements of FIG. 9B are numbered with the same reference numbers as FIG. 9A.

Figure 10A:
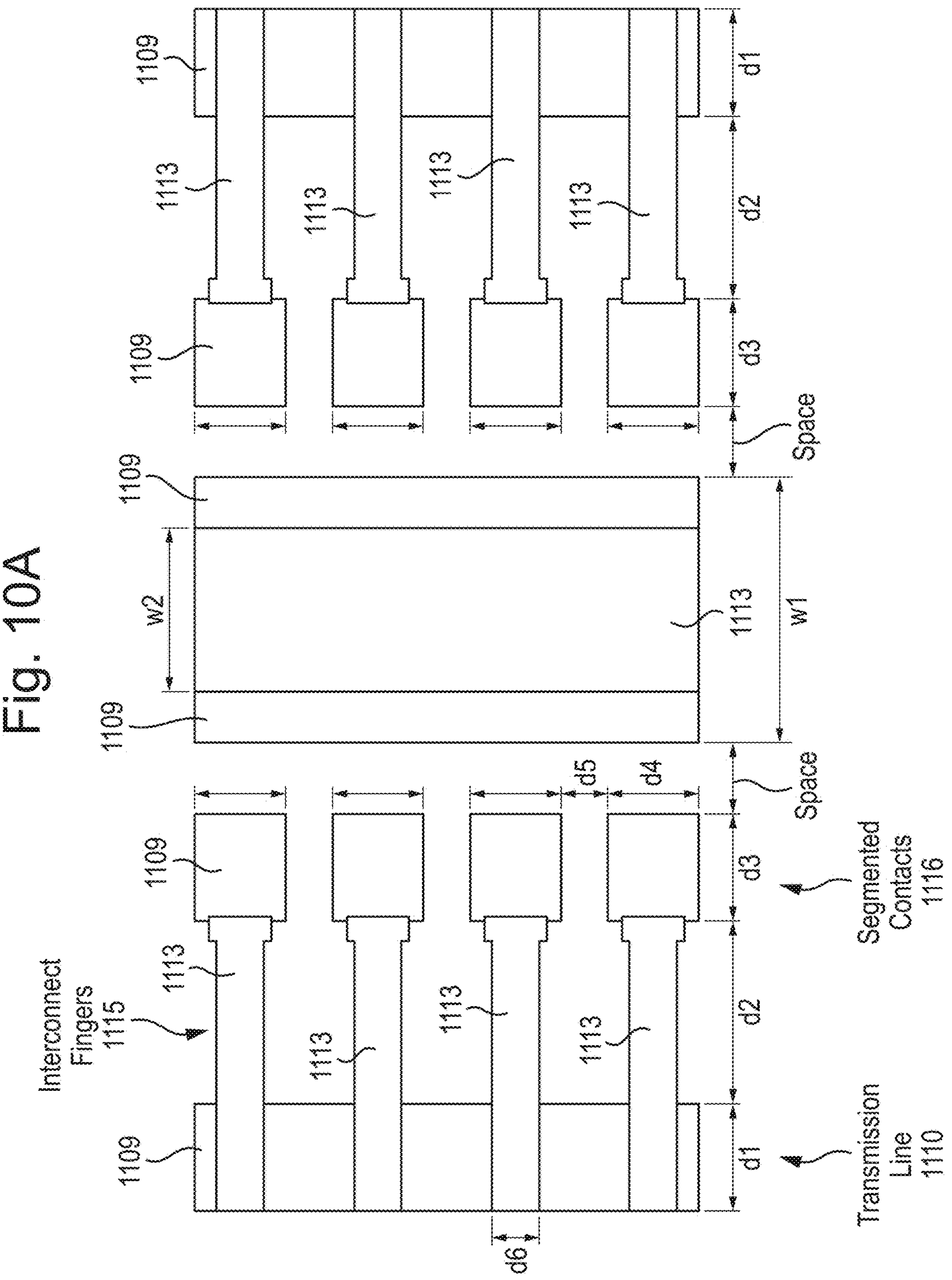
FIG. 10A is a schematic plan view of a metallization pattern for a distributed EAM module according to an aspect of the invention.

FIG. 10A is a schematic plan view of a metallization pattern for a distributed EAM module according to an aspect of the invention, such as illustrated in FIG. 9A and FIG. 9B. For example, this schematic plan view represents part of a length of a distributed EAM module, having 4 segmented contacts. This arrangement may serve as a building block for a distributed EAM module of a longer length, with a larger number of electrode segments 1116. The metal 1109 defines a contact transmission line 1110 having a width d1, e.g. ~3 μm wide, extending along the length of the EAM module. Each segmented contact 1116 has a width d3, e.g. ~4 μm wide, and each has a length d4, e.g. ~9 μm long, each separated by a spacing d5, e.g. ~1 μm. An overlying layer of interconnect metal 1113 defines interconnect members (fins or fingers) 1115 of length d2 and width d6. The width d6 may be a minimum width, e.g. ~2 μm, of the metal layer 1113. The length d2 of the interconnect members (fins or fingers) 1115 is selected to control the characteristic impedance of the transmission line for driving the EAM module. The ridge of the waveguide has a width of ~2 μm, and has a metal contact 1109 extending over the width of the ridge, and a contact electrode comprising metal 1113 which is ~1 μm to 2 μm wide. The segmented contacts 1116 are spaced from the sidewall of the ridge, e.g. by 0.5 μm. These dimensions are provided by way of example only and are not intended to be limiting in any way.

Increasing the length d2 of the interconnect members (fingers), increases the inductance, and therefore increases the characteristic impedance of the contact transmission line, which increases delay of the electrical drive signal relative to the optical signal. Increasing the characteristic impedance of the transmission line reduces the required drive current and driver power consumption as described above. Increasing the impedance increases the delay of the electrical drive signal relative to the optical signal, and creates a mismatch in delays, and decreases the bandwidth, which is a trade-off. For some applications, instead of matching the delays of the electrical drive signal and the optical signal for equalization and wave-shaping, it may be beneficial to provide a mismatch whereby the impedance is increased sufficiently to reduce the required drive current and power consumption, without significantly degrading the bandwidth. Other variations of these parameters may be used in some examples.

Thus, the design of the comb structure of the interconnect comprising the dimensions of the trace of the contact transmission line structure, the dimensions of the contact electrode segments, and the dimensions of the interconnect member (fingers) provide additional parameters for optimizing operational characteristics of a distributed EAM module. For example, the length of the interconnect members (fingers) is selected to optimize delays of the electrical signals, characteristic impedance of the transmission line, while maintaining a required bandwidth.

Figure 10B:
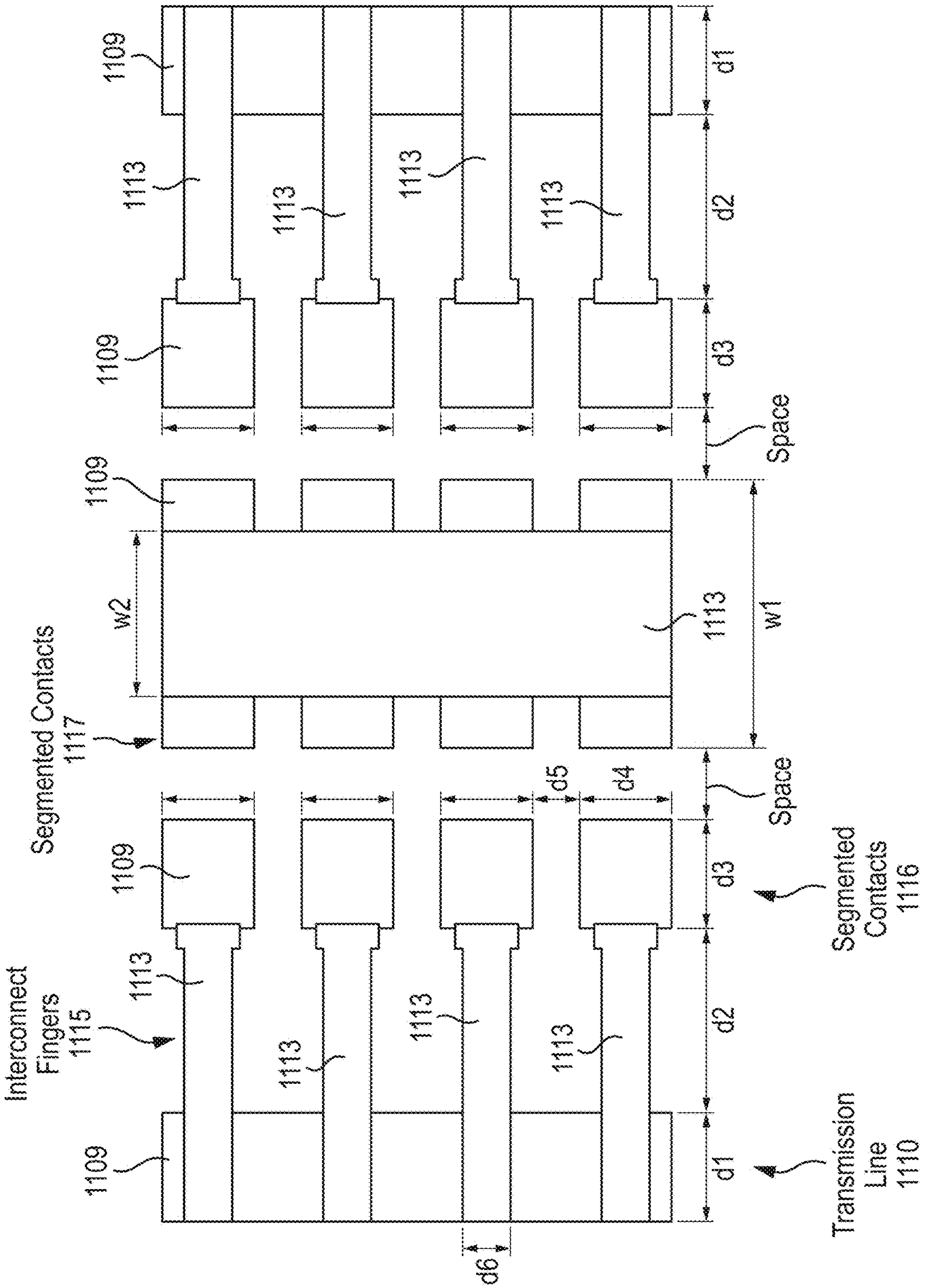
FIG. 10B is a schematic plan view of a metallization pattern for a distributed EAM module according to an aspect of the invention.

FIG. 10B is a schematic plan view of a metallization pattern for a distributed EAM module according to an aspect of the invention, such as illustrated in FIG. 9A and FIG. 9B. The metallization pattern shown in FIG. 10B differs from that shown in FIG. 10A in that the metal 1109 is patterned to provide segmented or discontinuous contacts 1117, similar to the contact structure 8117 shown in FIG. 8A.

Figure 11:
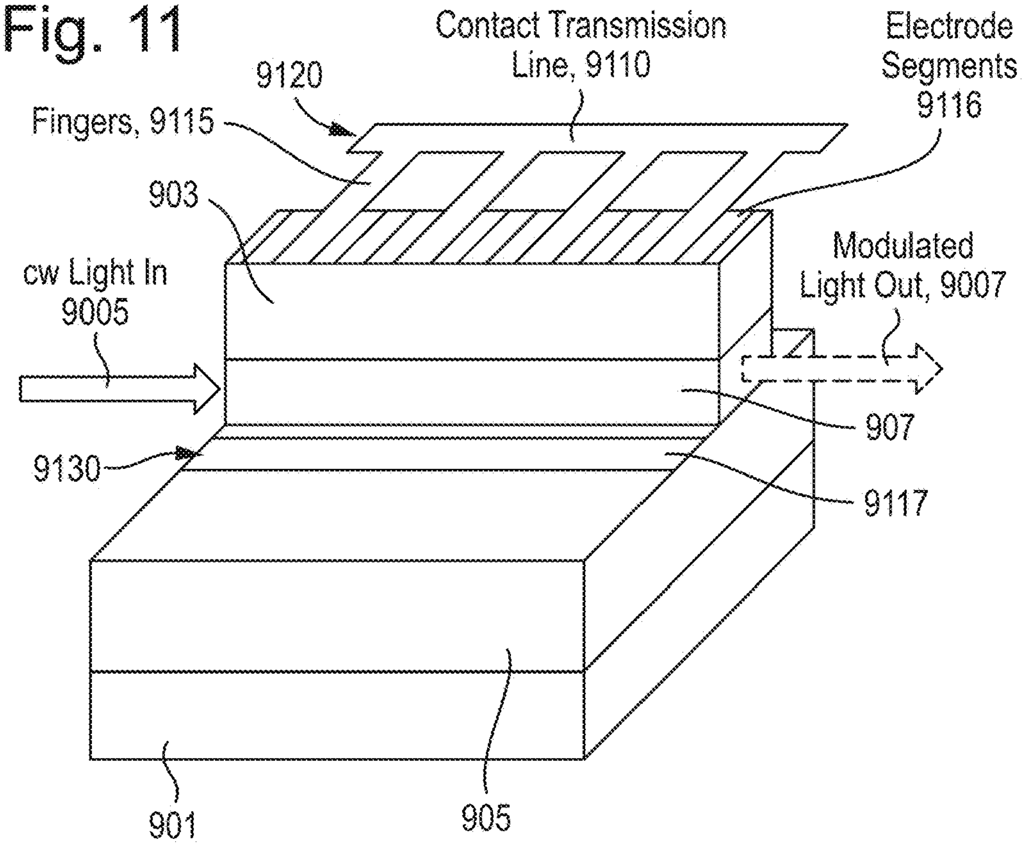
FIG. 11 is a schematic diagram of a distributed EAM module comprising a contact arrangement having a comb structure according to an aspect of the invention.

FIG. 11 is a schematic diagram of a distributed EAM module comprising a contact arrangement having a comb structure according to an aspect of the invention. In this embodiment, the top contact electrode has a comb structure 9120, and the side contact electrode 9130 is continuous. Elements of FIG. 11 which correspond to those shown in FIG. 9A are numbered with the same reference numerals.

Figure 12:
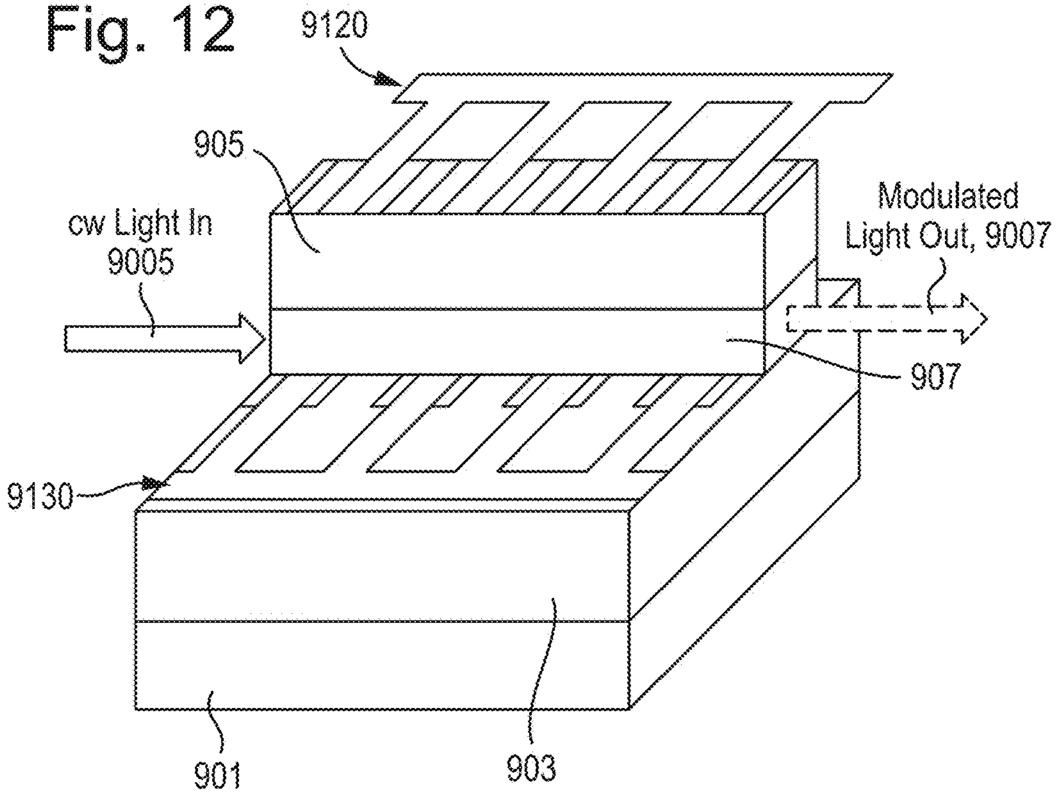
FIG. 12 is a schematic diagram of a distributed EAM module comprising a contact arrangement having a comb structure according to an aspect of the invention.

FIG. 12 is a schematic diagram of a distributed EAM module comprising a contact arrangement having a comb structure according to an aspect of the invention. In this embodiment, the top contact electrode has a comb structure 9120, and the side contact electrode 9130 also has a comb structure. Elements of FIG. 12 which correspond to those shown in FIG. 9A are numbered with the same reference numerals.

Figure 13:
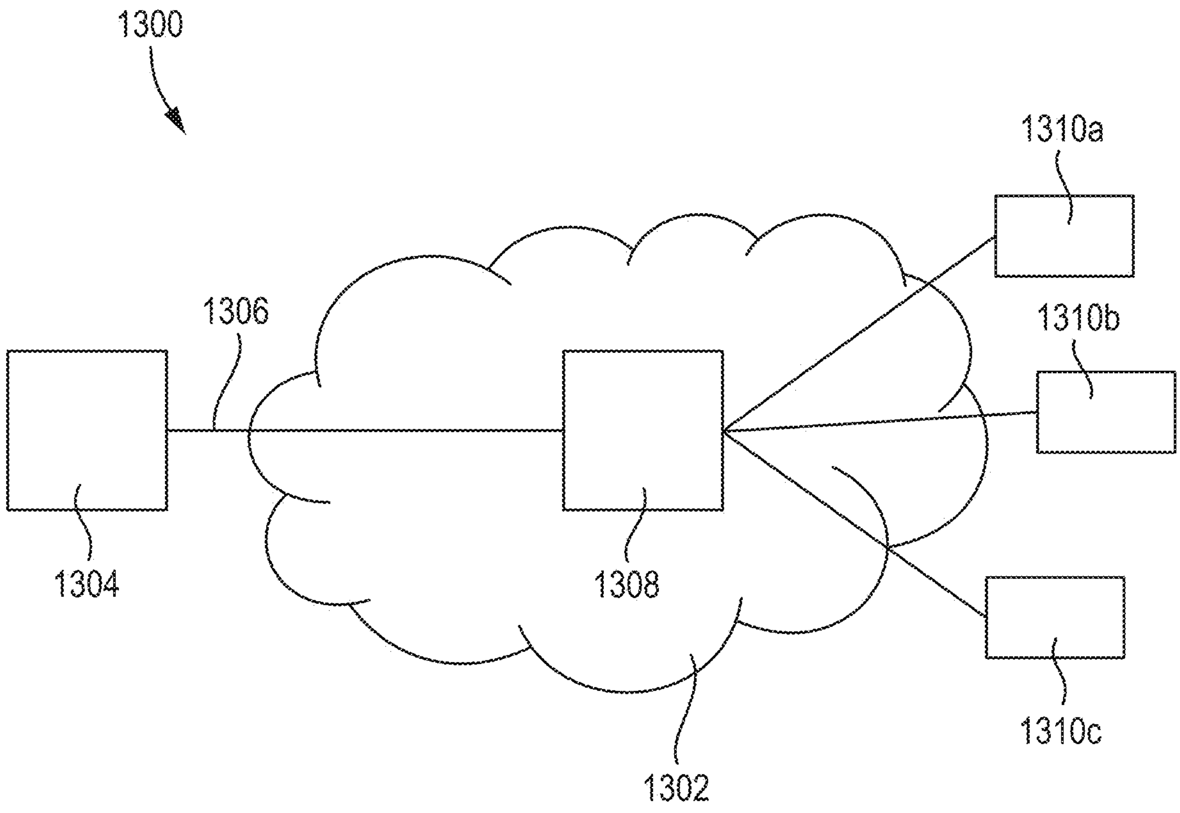
FIG. 13 shows a schematic functional block diagram of an optical distribution network according to an aspect of the present invention.

FIG. 13 shows a communication system 1300, according to an aspect of the present invention and which is configured to transmit and receive signals made up of multiple wavelengths. For example, applications such as CWDM for high-speed data interconnect, 5G network communications. The system 1300 is configured to operate with a network 1302 supporting a relevant application and communications are made via optical fibers (not shown). A transmitter 1304 at a service provider communicates via an optical signal 1306 carried by optical fibers (not shown) with receivers 1310*a*, 1310*b*, 1310*c* at respective multiple locations. The network may include a device 1308 for directing the transmitted signal to individual receivers. The nature in which this occurs is a beam splitter that can split the input into a plurality of outputs each destined for a particular location. There may be multiple beam splitters in the network depending on the nature of the original signal and the destinations. For example, a splitter per customer and a splitter per user.

It will be appreciated that the transmitter 1304 may include equivalent beam combiners or reverse beam splitters to combine multiple beams into a composite signal optical for transmission across the network. The transmitter may also include laser devices or modulators to generate the optical signal to be transmitted to the receivers, this will be described in greater detail below.

The system may include other devices and components as required.

Although the electrical signals have been illustrated as single-ended it should be understood that they may be differential. Although in example aspects illustrated, the one or more EAMs are shown as including three portions in each series, any number is contemplated, and the same consideration also for the number of gain stages and coupling circuits. It should be understood that the gain stages can be CMOS or bipolar stages with either gain or loss. It should be understood that the T-coils may be implemented with coupled coils but can be implemented with other shapes such as a metal trace.

While particular implementations and applications of the present invention have been illustrated and described, it is to be understood that the present invention is not limited to the precise construction and compositions disclosed herein and that various modifications, changes, and variations can be apparent from the foregoing descriptions without departing from the spirit and scope of an invention as defined in the appended claims.

The invention claimed is:

1. An electro-photonic integrated circuit comprising:

a distributed electro-absorption modulator (EAM) comprising a one or more EAM portions each having an absorption region and being optically coupled along an optical propagation path to generate a modulated optical output from an optical input to the EAM;

a distributed driver comprising a one or more driver portions each receiving a drive signal input for the EAM from an electrical input; and;

the distributed EAM being electrically coupled to the distributed driver along the optical propagation path via a discontinuous contact arrangement;

wherein the modulated optical output is based on the optical input and the electrical input to implement equalization, the equalization comprises controlling at least one of a propagation delay and a gain of one or more of the optical input and the electrical input to provide a desired signal characteristic in the modulated optical output;

wherein the distributed EAM comprises waveguide structure comprising a p-layer an i-region and a n-layer; and wherein the discontinuous contact arrangement comprises a first part formed on the p-layer and a second part formed on the n-layer and wherein at least one of the first and second part of the discontinuous contact arrangement comprising a transmission line having a comb structure.

2. The electro-photonic integrated circuit of claim 1, wherein the optical input and electrical input each have a different propagation delay.

3. The electro-photonic integrated circuit of claim 1, wherein an optical propagation delay and electrical propagation delay are substantial matched.

4. The electro-photonic integrated circuit of claim 1, wherein the propagation delay and the gain of the one or more of the optical input and the electrical input are combined to provide desired signal characteristics in the modulated optical output.

5. The electro-photonic integrated circuit of claim 1, wherein the distributed driver further includes one or more of a T-coil, a gain stage, a driver, a termination and a contact.

6. The electro-photonic integrated circuit of claim 1, wherein for each distributed EAM or EAM portion there is one or more distributed drivers or driver portions.

7. The electro-photonic integrated circuit of claim 1, wherein for each distributed driver or driver portion there are one or more EAMs or EAM portions.

8. The electro-photonic integrated circuit of claim 1, wherein an impedance of the distributed driver and characteristics of the distributed EAM are designed to match electrical propagation delay and optical propagation delay.

9. The electro-photonic integrated circuit of claim 1, wherein an impedance of the distributed driver and characteristics of the distributed EAM are designed to match electrical propagation delay and optical propagation delay to optimize bandwidth.

10. The electro-photonic integrated circuit of claim 1, wherein an impedance of the distributed driver and characteristics of the distributed EAM are designed to provide a mismatch of electrical propagation delay and optical propagation delay which increases a characteristic impedance of the distributed EAM to reduce power consumption.

11. The electro-photonic integrated circuit of claim 1, wherein an impedance of the distributed driver and characteristics of the distributed EAM are designed to provide a mismatch of electrical propagation delay and optical propagation delay which provides optimization of both a characteristic impedance and a bandwidth of the distributed EAM.

12. The electro-photonic integrated circuit of claim 1, wherein the transmission line extends between the electrical input, for receiving the drive signal input, and a transmission line termination.

13. The electro-photonic integrated circuit of claim 1, wherein the distributed EAM has an electrical contact extending along the optical propagation path of the distributed EAM and the distributed driver is connected continuously to the electrical contact.

14. The electro-photonic integrated circuit of claim 1, further comprising a gain stage at the electrical input of the distributed driver.

15. The electro-photonic integrated circuit of claim 1, wherein the distributed EAM has a plurality of segmented electrical contacts extending along the optical propagation path of the distributed EAM and the distributed driver is connected to the plurality of segmented electrical contacts of the discontinuous contact arrangement.

16. The electro-photonic integrated circuit of claim 15, wherein the plurality of segmented electrical contacts comprise a plurality of fins.

17. The electro-photonic integrated circuit of claim 1, wherein each EAM portion has an individual electrical contact, and the distributed driver has a connection to each individual electrical contact via the discontinuous contact arrangement.

18. The electro-photonic integrated circuit of claim 1, further comprising the distributed driver comprising one or more driver portions connected in series and distributed along the transmission line, running parallel to the an optical propagation path, the or each driver portion receiving a portion of the drive signal input and having a tap electrically connected to the or each EAM portion.

19. The electro-photonic integrated circuit of claim 18, wherein each tap comprises a gain stage.

20. The electro-photonic integrated circuit of claim 1, wherein a direction of electrical propagation is opposite to a direction of optical propagation.

21. The electro-photonic integrated circuit of claim 1, wherein the distributed EAM comprises one of:

a first plurality of EAM portions optically coupled in series; and a second plurality of EAM portions optically coupled in series, and wherein the first plurality of EAM portions are coupled in parallel with the second plurality of EAM portions.

22. The electro-photonic integrated circuit of claim 1, wherein the optical input comprises a travelling wave.

23. The electro-photonic integrated circuit of claim 1, the comb structure comprises the transmission line extending along the optical a propagation path of the distributed EAM and a plurality of electrode segments, each electrode segment contacting an EAM portion, and each electrode segment being connected to the transmission line by an interconnect member.

24. The electro-photonic integrated circuit of claim 23, wherein dimensions of the interconnect members of the comb structure comprise a length of the interconnect members selected to provide a characteristic impedance of the distributed EAM which matches an impedance of the distributed driver.

25. The electro-photonic integrated circuit of claim 23, wherein dimensions of the interconnect members of the comb structure comprise a length of the interconnect members selected to optimize a characteristic impedance and a bandwidth of the distributed EAM.

26. The electro-photonic integrated circuit of claim 23, wherein dimensions of the comb structure change impedance of the distributed driver based on one or more of:

(i) size, (ii) shape, and (iii) spacing of the interconnect members.

27. The electro-photonic integrated circuit of claim 1, wherein the comb structure further comprises one of: a single metallization layer; first and second metallization layers; and multi-layer metallization.

28. The electro-photonic integrated circuit of claim 1, comprising a laser configured to provide said optical input.

29. An optical system comprising the electro-photonic integrated circuit as defined in claim 1.

30. A method of operating the electro-photonic integrated circuit as defined in claim 1, the method comprising:

generating the modulated optical output from the optical input and the electrical input delivered via be discontinuous contact arrangement; and wherein the modulated optical output is based on the optical input and the electrical input to implement said equalization.

* * * * *